US012400648B2

(12) United States Patent
Min et al.

(10) Patent No.: US 12,400,648 B2
(45) Date of Patent: Aug. 26, 2025

(54) EVALUATING USER DEVICE ACTIVATIONS

(71) Applicant: Comcast Cable Communications, LLC, Philadelphia, PA (US)

(72) Inventors: Rui Min, Vienna, VA (US); Mariel Sabraw, Denver, CO (US); Hongcheng Wang, Arlington, VA (US); Stefan Deichmann, Alexandria, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 712 days.

(21) Appl. No.: 17/142,894

(22) Filed: Jan. 6, 2021

(65) Prior Publication Data

US 2022/0215835 A1 Jul. 7, 2022

(51) Int. Cl.
*G10L 15/22* (2006.01)
*G10L 15/08* (2006.01)

(52) U.S. Cl.
CPC .............. *G10L 15/22* (2013.01); *G10L 15/08* (2013.01)

(58) Field of Classification Search
None
See application file for complete search history.

(56) References Cited

U.S. PATENT DOCUMENTS

| | | | |
|---|---|---|---|
| 9,275,637 B1 * | 3/2016 | Salvador | G10L 15/06 |
| 9,368,105 B1 * | 6/2016 | Freed | G10L 15/22 |
| 9,548,053 B1 * | 1/2017 | Basye | G10L 15/22 |
| 9,691,378 B1 * | 6/2017 | Meyers | G10L 15/04 |
| 9,728,188 B1 * | 8/2017 | Rosen | G10L 25/51 |
| 9,940,949 B1 * | 4/2018 | Vitaladevuni | G10L 25/78 |
| 10,475,449 B2 * | 11/2019 | Lang | H04N 21/42203 |
| 11,508,362 B2 * | 11/2022 | Lee | G10L 21/0208 |
| 2013/0072080 A1 * | 3/2013 | Garbos | A63H 33/38 446/175 |
| 2016/0379635 A1 * | 12/2016 | Page | G10L 15/22 704/251 |
| 2017/0164217 A1 * | 6/2017 | Lazarescu | H04L 67/142 |
| 2019/0051297 A1 * | 2/2019 | Knudson | G10L 15/22 |
| 2019/0206411 A1 * | 7/2019 | Li | H04L 12/282 |
| 2019/0304443 A1 * | 10/2019 | Bhagwan | G06F 3/167 |
| 2020/0090646 A1 * | 3/2020 | Smith | G10L 15/30 |
| 2020/0111480 A1 * | 4/2020 | Hague | G10L 15/08 |
| 2021/0104242 A1 * | 4/2021 | Hashimoto | G06F 3/167 |

FOREIGN PATENT DOCUMENTS

| | | |
|---|---|---|
| EP | 3633673 A1 | 4/2020 |
| WO | 2020/123200 A2 | 6/2020 |

\* cited by examiner

*Primary Examiner* — Seong-Ah A Shin
(74) *Attorney, Agent, or Firm* — BakerHostetler

(57) ABSTRACT

Methods and systems are disclosed for determining a probability that a prospective wakeup or activation word is not an actual wakeup or activation word for a user device but instead is a word that has characteristics of, or otherwise sounds similar to, a wakeup or activation word and is received as a result of output of a content asset as opposed to being spoken by a user of the user device. Audio data associated with output of a content asset may be received and evaluated to determine if a prospective wakeup word in the audio data is an actual wakeup word or is, instead, not a wakeup word.

29 Claims, 13 Drawing Sheets

EVALUATING USER DEVICE ACTIVATIONS

BACKGROUND

User devices may be woken up or activated upon receiving audio data such as vocal instructions or utterances from a user containing a wakeup or activation word. Such activations may be desirable. User devices further may be activated when receiving audio data during output of a content asset that contains a wakeup or activation word. Such activations may be undesirable. Additionally, user devices may be activated when receiving audio data during output of a content asset that contains a word (or words) that has characteristics of, or otherwise sounds similar to, a wakeup or activation word but that is not an actual wakeup or activation word. Such activations also may be undesirable. It may be desired to recognize when a wakeup or activation word is received, or when a word or words that have characteristics of, or otherwise sound similar to, a wakeup or activation word is received, during output of a content asset to prevent undesired wakeups or activations of a user device. These and other shortcomings are addressed in the disclosure.

SUMMARY

Methods and systems are disclosed for determining a probability that a prospective wakeup or activation word is not an actual wakeup or activation word for a user device but instead is a word that has characteristics of, or otherwise sounds similar to, a wakeup or activation word and is received as a result of output of a content asset as opposed to being spoken by a user of the user device. Upon receipt of a prospective wakeup or activation word by a user device, audio data associated with output of a content asset may be received. A fingerprint of the audio data may be generated and compared to one or more stored fingerprints associated with the content asset. Additionally, the user device may receive an audio to text transcription of audio data received by the user device, for example, after receipt of the audio data containing the prospective wakeup word. This query transcription may be analyzed to determine a probability that the prospective wakeup or activation word is or is not an actual wakeup or activation word for the user device. As a result of this analysis, the prospective wakeup or activation word may be comprised on a block list or an allow list associated with the content asset and such lists may be sent to the user device and other user devices for further reference. These and other embodiments are further explained below.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings.

DETAILED DESCRIPTION

First audio data may be received from a premises. The first audio data may be associated with an output of a content asset and comprise a prospective wakeup word. Such a content asset may be output to or from a television, radio device, streaming device, or the like. The first audio data and other portions of the content asset may be stored in a content asset output device such as in the device's buffer. The prospective wakeup word may at least partially activate, at the premises, a user device that is capable of being activated upon receiving at least one of a plurality of wakeup words. Such a partial activation may partially activate, wake up, or trigger the user device to determine if it is to be fully woken up, or if already fully woken up, if it should stay woken up or if, instead, it should stay asleep, go back to sleep, or fully or partially deactivate. The plurality of wakeup words may not comprise the prospective wakeup word.

Second audio data may be received from the premises. Such second audio data may be received by the user device and sent along for further evaluation. A determination may be made based at least in part on the second audio data, that the plurality of wakeup words does not comprise the prospective wakeup word. Such determination may be made based on a determination of a probability that the prospective wake-up word is not comprised in the plurality of wakeup words. The second audio data may comprise an audio to text transcription of audio data received by the user device after the first audio data was received and may indicate a probability of whether a user is attempting to use the user device. A deactivation message may then be sent. Such a deactivation message may instruct the user device to deactivate (if it was activated fully or partially) or to stay asleep or to go back to sleep, depending on the state of the user device.

Furthermore, third audio data may be received that may be associated with the content asset and comprise the prospective wakeup word. The third audio data may be received from a second premises. A determination may be made that the third audio data matches, at least in part, the first audio data and this may further be used in determining that the prospective wakeup word is not comprised in the plurality of wakeup words.

Figure 1:
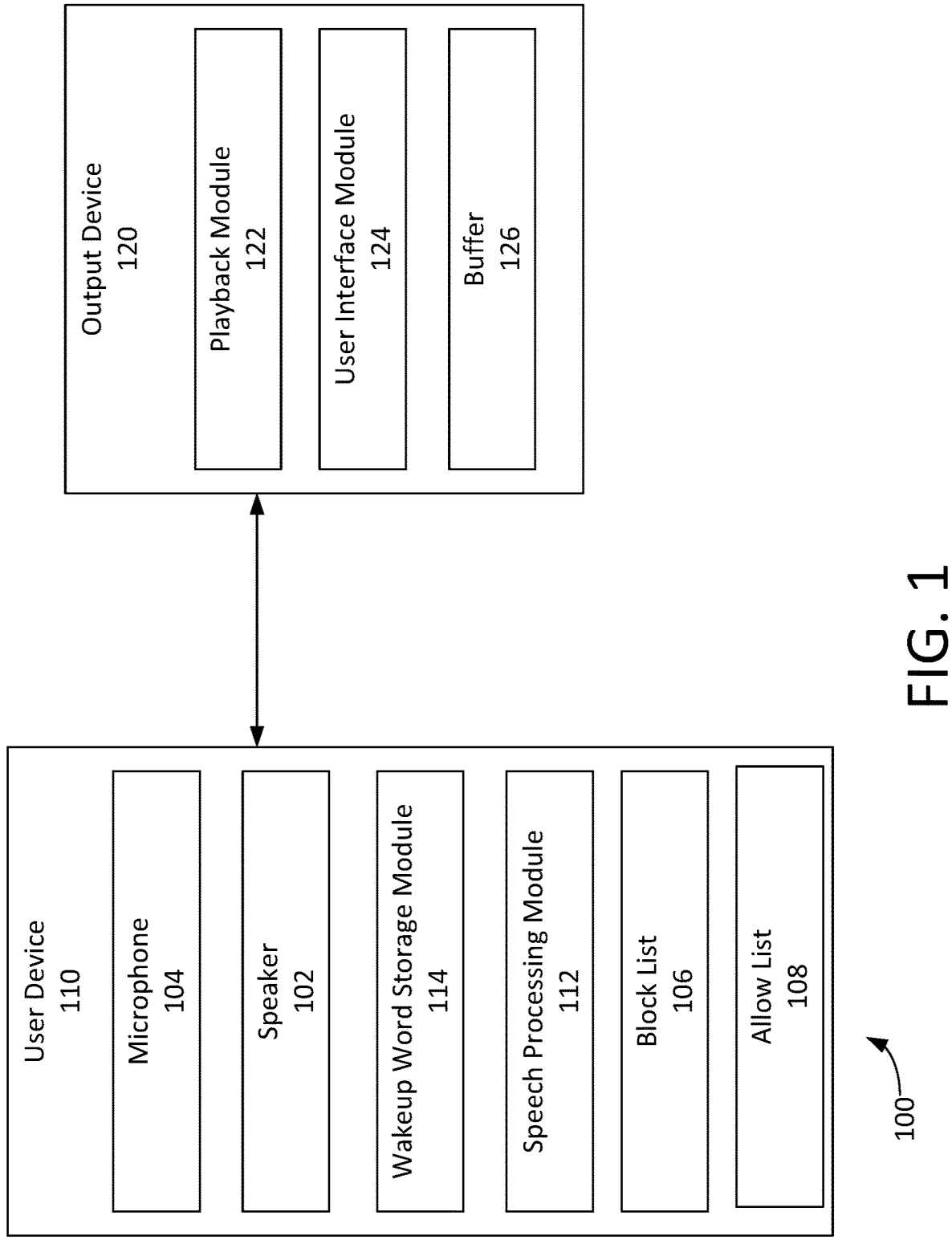
FIG. 1 is a block diagram of an example system.

An example system 100 is shown in FIG. 1. The system 100 may comprise a user device 110 and an output device 120 for the output or playback of a content asset. The user device 110 and the output device 120 may be, for example, located at a premises such that the user device 110 is physically situated and may receive audio data from output device 120. When a content asset is output by the output device 120, the user device 110 may receive audio data. For example, the output device 120 may be a set-top box communicatively connected to a television and may send content to the television for viewing. Alternatively, the output device 120 may be a television, projector, computer, smart device, mobile device, radio, audio playback device such as an MP3 player, any other playback device or any other device that outputs a content asset. The user device 110 may be located, for example, in the same room as the output device 120 or as a device to which the output device 120 is connected such that the user device 110 may receive output audio data from the output device 120.

The user device 110 may be a voice activated device configured to receive audio data spoken by a user. The spoken audio data may be received by the user device 110 as an audio input. For example, the user device 110 may be configured to receive a voice command spoken by a user of the user device 110 through the microphone 104. As a result of receiving such a voice command, the user device 110 may further be configured to perform an action dictated, for example, by the voice command such as respond to a question, provide information, execute a search, execute some other commanded action such as one associated with Internet-of-Things technology (e.g., turn on a light, lower a thermostat), or perform any other action for which the user device 110 is designed.

In response to the audio data and the voice command, the user device 110 may be configured to determine one or more executable operations and to cause executions of one or more of those operations. The user device 110 may be in communication with one or more other devices such as the output device 120, a gateway device, or any device on a network or on the Internet, in order to execute one or more voice commands spoken by a user. The user device 110 may be capable of executing such voice commands.

The user device 110 may be an "always-on" user device that is configured to monitor for the presence of audio signals generated by nearby devices or users of those devices. The always-on device may be configured to monitor for one or more identifiers, keywords, triggers, or wakeup words that cause the always-on device to execute some operation associated with a voice command following the key word, trigger, or wakeup word. In one example, the voice command may be the keyword or wakeup word itself and detection of the keyword or wakeup word by the user device 110 may cause the user device 110 to activate or execute an operation associated with the keyword or wakeup word.

Additionally or alternatively, the user device 110 may be configured to enter a "sleep" mode after a period of time and may not monitor for one or more identifiers from nearby devices or users of those devices. During a sleep mode, the user device 110 may be configured to ignore all audio data until a keyword, wakeup word or other trigger is detected at the user device 110. Upon the detection of one or more recognized wakeup words, keywords, or triggers. the user device 110 may be configured to become activated. The user device 110 may also be configured to interact with a user of the device through speaker 102, such as by generating an output confirming the execution of a voice command uttered by a user of the device.

The speech processing module 112 may be configured to recognize one or more words or phrases received at the user device 110 as audio data or a voice command. The speech processing module 110 may comprise, for example, one or more of a speech capture module, a digital signal processor (DSP) module, a preprocessed signal storage module, and a reference speech pattern and pattern matching algorithm module. As is well known in the art, speech processing may be done in a variety of ways and at different levels of complexity, for example, using one or more of pattern matching, pattern and feature analysis, and language modeling and statistical analysis. However, it is understood that any type of speech processing may be used, and the examples provided herein are not intended to limit the capabilities of the speech processing module 112.

The speech processing module 112 may be configured with a number of keywords or wakeup words or triggers, such as those stored in wakeup word storage module 114. The wakeup word storage module 114 may comprise a number of wakeup words or keywords or triggers that are recognizable by the speech processor 112 using, for example, pattern matching, and may allow a user to interact with content presented during playback of a content asset.

The output device 120 may comprise a playback module 122, a user interface module 124, and a buffer 126. The output device 120 may be configured to receive a request from a user associated with viewing or listening to a content asset such as a linear television program, a video-on-demand program, a recorded program, an internet-based program, a website such as website for streaming video content, a radio program, a podcast, or streaming audio content or music. The output device 120 may comprise a user interface module 124 through which a user may interact with the output device 120 to select a content asset for viewing, to change picture or audio or other settings, change volume, navigate a content-guide menu or perform a myriad of other tasks. Such a request may be made, for example, by a user clicking a remote control device, by voicing commands to a remote control device, by voicing commands to the user device 110, or by any other mechanism. The output device 120 may be configured to present a content asset to a user over one or more screens, monitors, displays, speakers, etc. The content asset may be any type of asset, for example, a video clip, a movie asset, a television asset, a live broadcast asset such as a sporting event, an audio asset such as music streaming or podcast, or a Video on Demand (VOD) asset. However, it is understood that the content asset may be any type of content asset having any length or duration. The content asset may be in any one of a variety of formats, such as, for example, H.264, MPEG-4 Part 2, or MPEG-2. The content asset may be transmitted using one or more standards such as SCTE 35 or other specifications.

Digital audio/video compression may be utilized for the content asset, such as MPEG, or any other type of compression. For example, in an MPEG encoded transmission, content and other data are transmitted in packets, which collectively make up a transport stream. However, the present methods and systems are not so limited, and may be implemented using other types of transmission and data.

The output of a single MPEG audio and/or video coder may be referred to as a transport stream. The transport stream may comprise one or more elementary streams. An elementary stream may be or comprise an endless near real-time signal. For convenience, the elementary stream may be broken into data blocks of manageable size, forming a packetized elementary stream (PES). These data blocks need header information to identify the start of the packets and must comprise time stamps because packetizing disrupts the time axis. For transmission and digital broadcasting, for example, several programs (e.g., content assets) and their associated PESs may be multiplexed into a multi program transport stream. A multi program transport stream has a program clock reference (PCR) mechanism that allows transmission of multiple clocks, one of which may be selected and regenerated at the decoder.

A multi program transport stream may comprise a multiplex of audio and video PESs. In addition to the compressed audio, video and data, a transport stream may comprise metadata describing the bit stream. Such metadata may comprise a program association table (PAT) that lists every content asset (e.g., program) in the multi program transport stream. Each entry in the PAT may point to a program map table (PMT) that lists the elementary streams making up each content asset. Some content may be unencrypted, but some content may be subject to conditional access (encryption) and this information is also carried in the metadata. The transport stream may be comprised of fixed-size data packets, for example, each containing 188 bytes. Each packet may carry a program identifier code (PID). Packets in the same elementary stream may all have the same PID, so that the decoder (or a demultiplexer) may select the elementary stream(s) it wants and reject the remainder. Packet continuity counts ensure that every packet that is needed to decode a stream is received. A synchronization system may be used so that decoders may correctly identify the beginning of each packet and deserialize the bit stream into words.

A content asset may comprise a group of one or more PIDs that are related to each other. For instance, a multi program transport stream used in digital television might contain three programs, to represent three television channels. In some examples, each channel may comprise one video stream, one or two audio streams, and any necessary metadata. A receiver wishing to tune to a particular "channel," for example, merely has to decode the payload of the PIDs associated with its program.

The output device 120 may be in communication with an external service provider such as a content provider in order to present output or playback of the content asset to the user. The output device 120 may be in communication with a device configured to present the content asset to the user. For example, the output device module 120 may be electrically connected to a television, to a hand-held device such as a cellular telephone through a WiFi connection in order to present the content to the user, to speakers, or to any other device.

The output device 120 further may comprise a buffer 126. The buffer 126 may store content such as before it is output, played, or otherwise used. Portions of content assets received by the output device may be stored in the buffer 126 before being output, played or otherwise used so that there is no interruption from the perspective of the user during viewing or listening.

The user device 110 may receive a media mention, for example, during output or playback of a content asset that is output by or to the output device 120. A media mention may occur, for example, when the user device 110 is triggered by a wakeup word not spoken by a user but instead aired or otherwise received during output or playback of a content asset being output from the output device 120 or output from a device coupled to the output device 120, such as a television. The media mention of a wakeup word, trigger, or keyword may activate the user device 110 as if spoken instead by a user. That is, the user device 110 may not recognize and ignore a media mention even though it was not spoken by a user of the user device 110 but instead was played by a television, radio, audio speaker and the like. Consequently, the user device 110 may be activated by a media mention during playback of a video content asset when it was not any user's intent to activate the user device 110. Such activation may be undesired by users of the user device 110.

Furthermore, during playback of a content asset that is output from the output device 120, audio data may be received by the user device that activates the user device even though a wakeup word, trigger, or keyword was not actually output during playback of the video content asset or otherwise voiced by a user of the user device 110. That is, such audio data may not be a media mention of a wakeup, trigger, or keyword word but instead may be a media mention of a word that is mistakenly interpreted by the user device 110 as a wakeup word, trigger, or keyword because of similarities to a wakeup word, trigger, or keyword. Such audio data received during playback of a video content asset is referred to herein as a "near media mention" or a "prospective wakeup word" or a "potential wakeup word" or a "potential trigger" or a "potential keyword." A near media mention or potential wakeup word may be close enough in sound to the user device 110 to be mistakenly interpreted as a wakeup word, keyword, or trigger used to activate the user device 110. During playback, potentially unexpected terms or words—that is, near media mentions or prospective or potential wakeup words, triggers or keywords—may trigger or activate the user device 110 because such near media mentions may share enough similar characteristics to wakeup words or triggers or keywords. For example, a near media mention may sound similar to a wakeup word, trigger, or key word, at least to the user device 110.

The user device 110 may further comprise a block list 106. The block list 106 may contain a list of media mentions or of near media mentions or both. Upon receipt of audio data, the user device 110 may consult the block list 106 to determine whether the received audio data is or comprises a media mention or near media mention. If the user device finds a match between the received audio data and a media mention or near media mention on the block list, then the user device 110 may not activate in response to receiving the media mention or near media mention or, if it did activate upon receipt, then it may deactivate. To the user in such a scenario, the user device 110 may appear to have not woken up or to have woken up and gone back to sleep.

The user device 110 may be in communication with the output device 120 and the output device 120 may communicate the content asset currently being output by the output device 120. Alternatively, the user device 110 may be in communication with an external service provider such as a content provider providing content assets to the output device 120. The external service provider or content provider may provide information to the user device 110 regarding the content asset currently being output by the output device 120. The user device 110 may consult the block list 106 with not only a received media mention or near media mention but also with information about the content asset being output at that time. For example, the block list 110 may comprise not only a listing of media mentions and/or near media mentions but also content assets with which the media mentions and/or near media mentions are associated. Upon receipt of audio data, if the user device 110 comprises a block list associated with the content asset, then if may compare the received audio data with the media mentions or near media mentions associated with the content asset. If the user device 110 finds a match as a result of this comparison, then it may either not activate (if it had not yet activated upon receiving the media mention or near media mention) or it may deactivate (if it had initially activated upon receiving the media mention or the near media mention). Thus the user device 110 or the block list 106 may comprise data about the content asset currently being output by output device 120.

The user device 110 may further comprise an allow list 108. The allow list 108 may comprise information about the content asset currently being output by output device 120. Such information may comprise portions or time periods or chapters or other sections of a content asset being output by output device 120 that do not comprise media mentions or near media mentions. In this way, if user device 110 is activated or otherwise receives a wakeup word or prospective wakeup word, the user device 110 may consult the allow list 108 and determine that the activation or the received wakeup word or prospective wakeup word did not originate from the output device 120. Thus the user device 110 may then determine that the audio data it received is actually a wakeup word and then activate or activate further to, for example, execute a forthcoming command or direction. Alternatively, the user device 110 may then proceed through other processing to determine if it did receive a wakeup word from a user.

Figure 2:
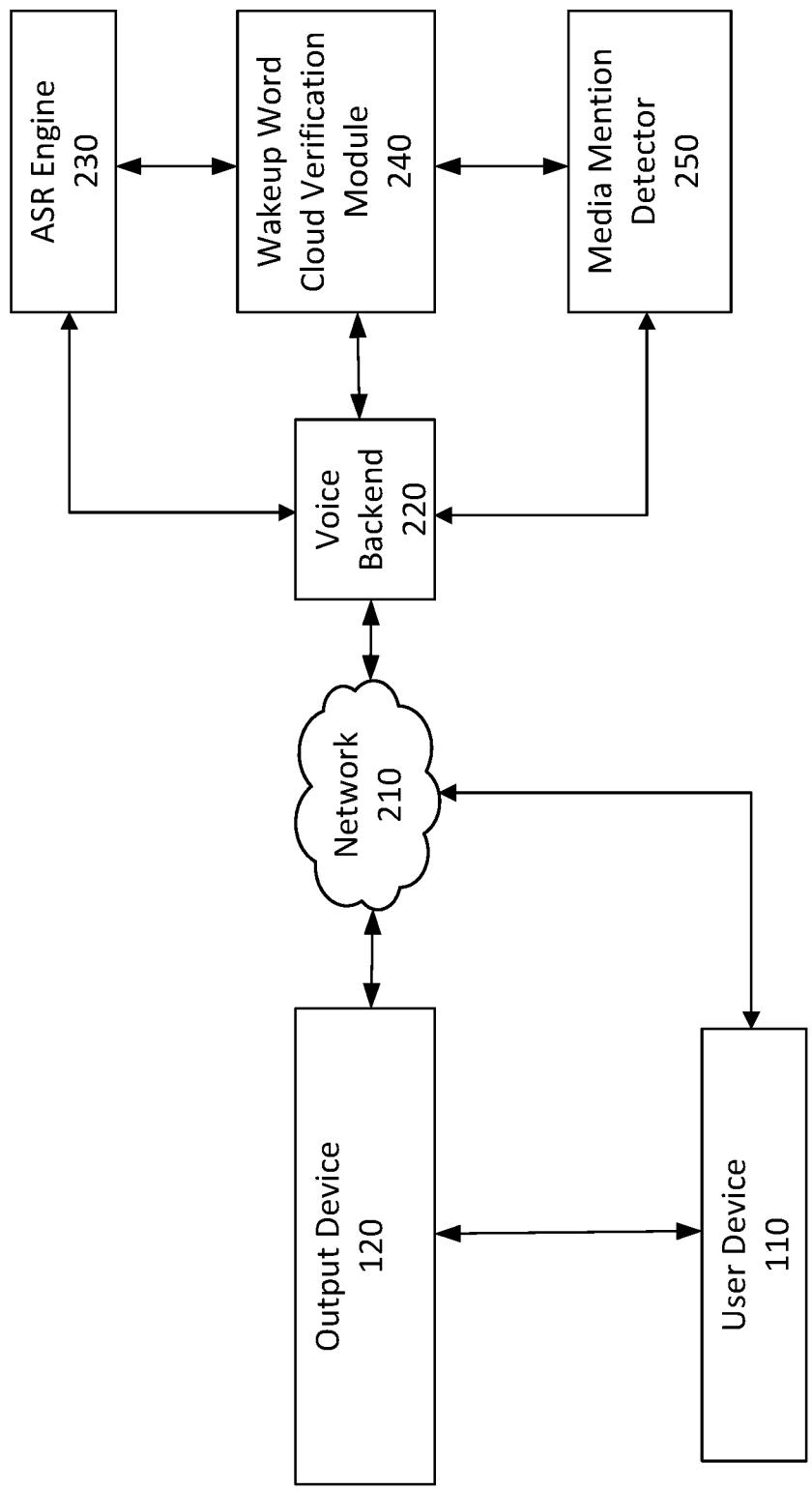
FIG. 2 is a block diagram of an example system.

An example system 200 is shown in FIG. 2. The system 200 may comprise the user device 110 and the output device 120 described with respect to FIG. 1. As described with respect to FIG. 1, the user device 110 and the output device 120 may be configured to communicate with one another. Additionally or alternatively, the user device 110 may be within "ear shot" of the output device 120 or of a device that displays or plays a content asset received from the output device 120. The user device 110 may receive audio data output by the output device 120.

The user device 110 and the output device 120 further may be in communication with or connected to a network 210. Such network may be any network such as the internet, a LAN, a WAN, a cable network, or any other type of network. The system 200 may comprise a voice backend 220 also in communication with or connected to the network 210. The voice backend 220 may be capable of communicating with the user device 110 or the output device 120 or both. The voice backend 220 may be capable of receiving audio data, voice commands, queries, commands or information from the user device 110, the output device 120 or both. The voice backend 220 may further be capable of sending audio data, voice commands, or voice queries that it receives from network 210 to automatic speech recognition engine (ASR) engine 230. The ASR engine 230 may be capable of performing speech-recognition functions on audio data, voice commands, or voice queries that it receives to transcribe or convert any speech into text. Such speech recognition is well-known in the art.

The ASR Engine 230, the voice backend 220, or both may be connected to or otherwise in communication with wakeup word cloud verification module 240. The wakeup word cloud verification module may comprise a list of wakeup words that may be used to wake up or activate or further activate a user device such as the user device 110. The wakeup word cloud verification module 240 may be capable of comparing received audio data from the voice backend 220 which may, in turn, have been received from the output device 120 or the user device 110, and further may be capable of determining that the received audio data comprises a wakeup word, trigger, keyword or activation word for a user device such as user device 110. Alternatively, the wakeup word cloud verification module 240 may be capable of receiving text of audio data from the ASR engine 230 and comparing such received text to stored texts and determining whether text associated with an audio file comprises a wakeup word, trigger, keyword or activation word. If the wakeup word cloud verification module 240 determines that the received audio data or text does comprise a wakeup word, then it may communicate an activation signal or command, a listen signal or command, or any other data, signal or command to the voice backend 220. Alternatively, the wakeup word cloud verification module 240 may send a message to the voice backend 220 that the received audio data comprised a wakeup word. Upon receipt, the voice backend 220 may communicate a wakeup, activation, other command, or data to the user device 110 or to the output device 120 through the network 210. If the voice backend 220 communicates with the output device 120, then the output device 120 may communicate a wakeup command or any other received information, data or signal to the user device 110.

The wakeup word cloud verification module 240 further may be capable of sending audio data received from the voice backend 220 to the ASR engine 230 so that the ASR engine 230 may perform speech recognition on the audio data and provide corresponding text back to the wakeup word cloud verification module 240 or to the voice backend 220 for further processing.

The system 200 may further comprise a media mention detector 250. The media mention detector 250 may be in communication with the wakeup word cloud verification module 240, the voice backend 220, or both. The voice backend 220 or the wakeup word cloud verification module 240 may send to the media mention detector 250 audio data received from network 210 that may be, for example, sent by output device 120, user device 110, or both. The media mention detector 250 may determine that a wakeup word in the audio data is or is likely or unlikely a media mention or near media mention. If the media mention detector 250 determines that a wakeup word in audio data is or is likely a media mention—e.g., that the wakeup word was not voiced by a user of user device 110 but instead was voiced during output of a content asset by output device 120—then the media mention detector 250 may send to the voice backend 220 or the wakeup word cloud verification module 240 a deactivation or no-activation command for forwarding to the user device 110 through network 210. The user device 110 may receive the deactivation or no-activation command, either directly from network 210 or from the output device 120 and may then deactivate (if already activated) or not activate if not already activated.

Alternatively, the media mention detector 250 may determine that a wakeup word in the audio data is not a media mention. If the media mention detector 250 determines that a wakeup word in audio data is not or is likely not a media mention—e.g., that the wakeup word was not voiced during output of a content asset by output device 120—then the media mention detector may send to the voice backend 220 or the wakeup word cloud verification module 240 an activation or listen command for forwarding to the user device 110 through network 210. The user device 110 may receive the activation or listen command, either directly from network 210 or from the output device 120 and may then activate, stay activated (if already activated) or listen for further audio data. Alternatively or additionally, if the media mention detector 250 determines that a wakeup word in audio data is not or is likely not a media mention—e.g., that the wakeup word was not voiced during output of a content asset by output device 120—then the media mention detector may send a message to the wakeup word cloud verification module 240 for further processing to determine if the user device 110 received the wakeup word as part of an audio file from a user of the user device 110.

Additionally or alternatively, the media mention detector 250 may determine that a prospective wakeup word in the audio data is not a media mention but instead is or is likely a near media mention and therefore is not a wakeup word, trigger, keyword, or activation word. If the media mention detector 250 determines that a wakeup word in audio data is or is likely a near media mention, then the media mention detector 250 may send to the voice backend 220 or the wakeup word cloud verification module 240 a deactivation or no-activation command for forwarding to the user device 110 through network 210. The user device 110 may receive the deactivation or no-activation command, either directly from network 210 or from the output device 120 and may then deactivate (if already activated) or not activate if not already activated.

Figure 3:
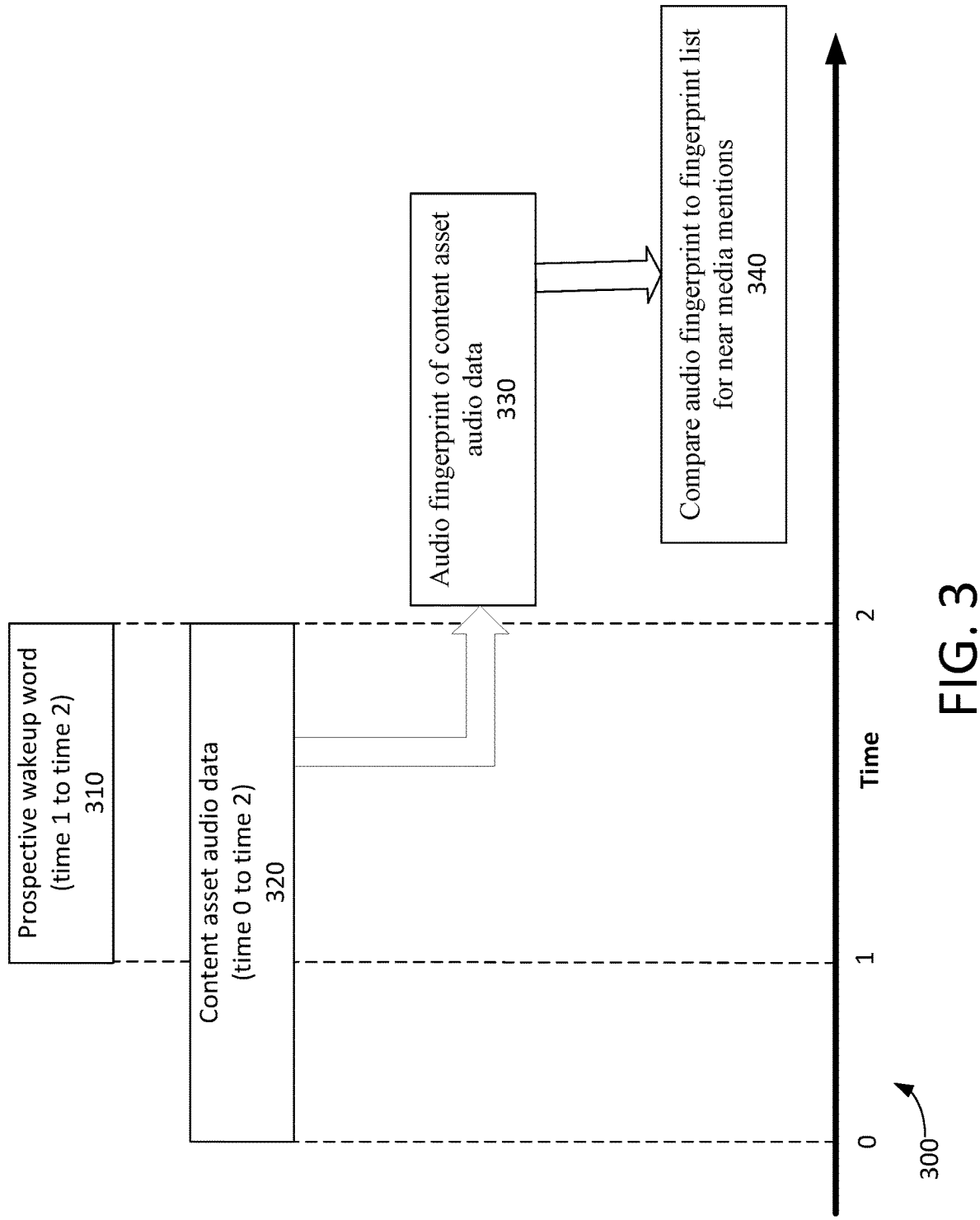
FIG. 3 is a flow chart of an example method.

An example process 300 is shown in FIG. 3. Prior to the process 300 commencing, a user device such as the user device 110 shown in FIG. 1 may be configured to wake up upon receiving audio data from a user of the device comprising certain wakeup words, such as, for example, "wake up" or "hey handsfree device" or "Pete." Upon receiving audio data, e.g., spoken by a user, that comprises one of these wake up words, the user device 110 may wakeup or activate and await a command, such as, for example, "what day is today?" or "change the television channel to the news" or "play classical music," etc. In other words, receiving a wakeup word from a user may activate or wake up the user device so that it is then "listening" and ready to act upon a command or question for which it is capable of responding.

Turning to FIG. 3, as shown with respect to step 310, from time 1 to time 2, a user device such as the user device 110 shown in FIG. 1 may receive audio data comprising a prospective wakeup word. Such prospective wakeup word may be a wakeup word for which the user device 110 may activate or wakeup, or it may not be a wakeup word. Additionally, such prospective wakeup word may not have been spoken by a user but instead may have been played through a speaker of a television, audio player such as a radio, a home hub panel, or other content asset output device, such as the output device 120 described with respect to FIG. 1 or a device connected to the output device 120. That is, the prospective wakeup word may be a media mention of a wakeup word. Additionally or alternatively, such prospective wakeup word may be perceived to be a wakeup word by the user device 110 though it may instead be a word that is not the wakeup word. For example, the prospective wakeup word may sound similar to a wakeup word for the user device 110, such as "make up" and not wakeup word "wake up"; or "hey, hands off of my device" instead of wakeup word "hey, handsfree device"; or "sheet" instead of wakeup word "Pete." Additionally, such prospective wakeup word that is not an actual wakeup word may have been played through a speaker of a television or radio or other content asset output device, such as the output device 120 described with respect to FIG. 1. That is, the prospective wakeup word may be a near-media mention of a wakeup word.

Upon receipt of the prospective wakeup word, audio data of a content asset that was output by, for example, output device 120 (or a device connected to output device 120) at time 1 to time 2 may be retrieved at step 320. Such retrieved audio data may be audio data that was played at the same time that the prospective wakeup word was received by the user device 110. Additionally or alternatively, as shown, such retrieved audio data output from output device 120 may encompass audio data output from time 0 to time 2, thereby including not only audio data output simultaneously with the reception of the prospective wakeup word from time 1 to time 2 but also audio data that preceded the wakeup word, e.g., from time 0 to time 2. Alternatively or additionally, the audio data associated with a content asset being output at time 1 to time 2 may be retrieved for a longer duration before time 0 and after time 2. Whether retrieved from time 0 to time 2 or for a period of time preceding time 0 and/or succeeding time 2, such retrieved audio data may be retrieved from a buffer of the content asset output device 120, such as in buffer 126 described with respect to FIG. 1. Alternatively or additionally, such retrieved audio data may be retrieved from other memory of the output device 120.

At step 330, an audio fingerprint of the content asset audio data retrieved at step 320 may be generated. Such fingerprints are well known in the art, and methods for generating such fingerprints of audio data are likewise well-known in the art and available from, for example, open-source repositories and other sources as well. At step 340, the audio fingerprint generated at step 330 may be compared to stored fingerprints of audio data associated with the content asset. Such stored fingerprints may comprise audio data for prospective near-media mentions associated with the content asset or for suspected near-media mentions associated with the content asset.

If the comparison results in a match, then the fingerprint generated at step 330 may be stored with the stored fingerprints for future use. Such stored fingerprints may form a cluster associated with the content asset. Such clusters may be analyzed to determine if audio data associated with the content asset that is associated with a cluster comprises a media mention, a near media mention, or neither. If the cluster is determined to comprise a media mention or near media mention, then such information may be conveyed to output device 120 or handsfree device 110 for storage in either or both of the devices in, for example, a block list such as the block list 106 described with respect to FIG. 1. If the cluster is determined to not comprise a media mention or a near media mention, then such information may be conveyed to output device 120 or handsfree device 110 for storage in either or both of the devices in, for example, an allow list such as the allow list 108 described with respect to FIG. 1.

Figure 4:
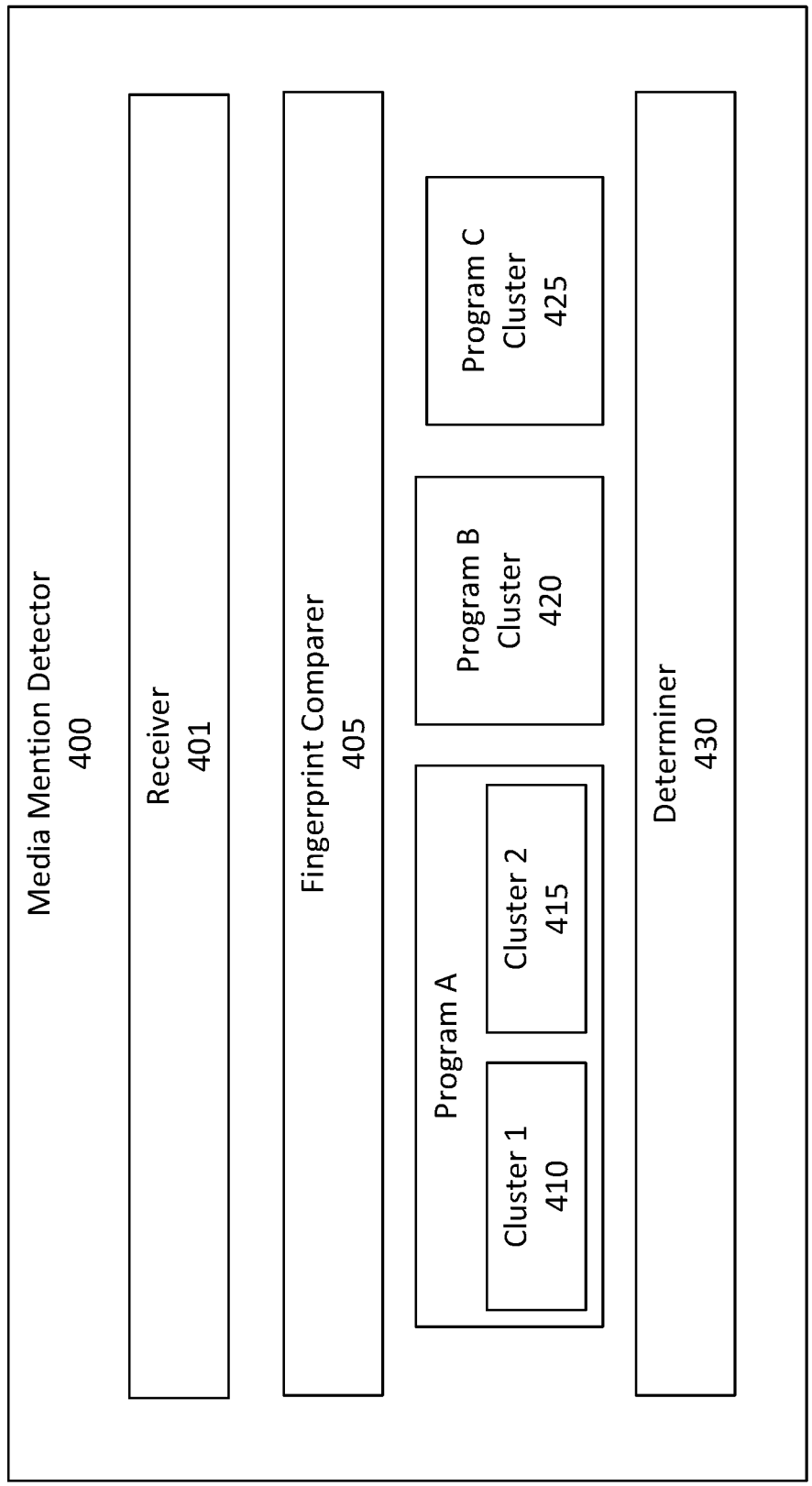
FIG. 4 is a block diagram of an example system.

A logical diagram of a device 400 is shown in FIG. 4. The device 400 may be a media mention detector 400 such as the media mention detector 250 shown in FIG. 2. The media mention detector 400 may comprise a receiver 401 that is capable of receiving fingerprints of content asset audio data as described with respect to FIG. 3. Such a fingerprint may comprise audio data associated with a content asset that comprises a prospective wakeup word as described with respect to FIG. 2 and FIG. 3.

The media mention detector may further comprise a fingerprint comparer 405. The fingerprint comparer 405 may compare a received fingerprint associated with a content asset's audio data to stored fingerprints associated with that content asset. If the fingerprint comparer 405 determines a match, then the received fingerprint may be stored with the stored fingerprints in a cluster associated with that that content asset.

The media mention detector 400 may comprise one or more clusters 410, 415, 420, 425 of stored fingerprints. For example, the media mention detector may comprise cluster 1 410. Cluster 1 410 may comprise stored fingerprints associated with content asset Program A. Such stored fingerprints in cluster 1 410 may be associated with a portion of Program A that produced audio data having a duration at, for example, toward the beginning of program A. The cluster 1 410 may be open such that, after the fingerprint comparer compares a received fingerprint associated with content asset Program A to one or more stored fingerprints associated with the content asset Program A and finds a match as a result of the comparison, the received fingerprint may be stored in cluster 1 410. Alternatively or additionally, cluster 1 may be a closed cluster and additional received fingerprints associated with content asset Program A may not be added to cluster 1 410. A determination may be made to close cluster 1 410 when it comprises enough fingerprints. Cluster 1 410 may comprise data indicating that the cluster 1 410 comprises a media mention that may indicate that content asset Program A, cluster 1 410 comprises a wakeup word. Alternatively or additionally, cluster 1 410 may comprise data indicating that the cluster 1 410 comprises a near media mention that may indicate that content asset Program A, cluster 1 410 does not comprise a wakeup word but does comprise a word or words that are similar to a wakeup word such as, for example, because the word or words sound similar to a wakeup word. Cluster 1 410 may therefore be used to generate a block list such as the block list 106 described with respect to FIG. 1.

The media mention detector 400 may comprise cluster 2 415 associated with content asset Program A. Cluster 2 415 may comprise stored fingerprints associated with content asset Program A. Such stored fingerprints in cluster 2 415 may be associated with a portion of Program A that produced audio data having a duration, for example, toward the middle of program A—that is, a portion that is different from the portion associated with cluster 1 410. The cluster 2 415 may be open such that, after the fingerprint comparer compares a received fingerprint associated with content asset Program A to one or more stored fingerprints associated with the content asset Program A and finds a match as a result of the comparison, the received fingerprint may be stored in cluster 2 415. Alternatively or additionally, cluster 2 may be a closed cluster and additional received fingerprints associated with content asset Program A may not be added to cluster 2 415. A determination may be made to close cluster 2 415 when it comprises enough fingerprints. Cluster 2 415 may comprise data indicating that the cluster 2 415 comprises a media mention that may indicate that content asset Program A, cluster 2 415 comprises a wakeup word. Alternatively or additionally, cluster 2 415 may comprise data indicating that the cluster 2 415 comprises a near media mention that may indicate that content asset Program A, cluster 2 415 does not comprise a wakeup word but does comprise a word or words that are similar to a wakeup word such as, for example, because the word or words sound similar to a wakeup word. Cluster 2 415 may therefore be used to generate a block list such as the block list 106 described with respect to FIG. 1.

The media mention detector 400 may comprise a cluster 420 associated with content asset Program B. Cluster 420 may comprise stored fingerprints associated with content asset Program B that is a different program from Program A. The cluster 420 may be open such that, after the fingerprint comparer compares a received fingerprint associated with content asset Program B to one or more stored fingerprints associated with the content asset Program B and finds a match as a result of the comparison, the received fingerprint may be stored in cluster 420. Alternatively or additionally, cluster 420 may be a closed cluster and additional received fingerprints associated with content asset Program B may not be added to cluster 420. A determination may be made to close cluster 420 when it comprises enough fingerprints. Cluster 420 may comprise data indicating that the cluster 420 comprises a media mention that may indicate that content asset Program B, cluster 420 comprises a wakeup word. Alternatively or additionally, cluster 420 may comprise data indicating that the cluster 420 comprises a near media mention that may indicate that content asset Program B, cluster 420 does not comprise a wakeup word but does comprise a word or words that are similar to a wakeup word such as, for example, because the word or words sound similar to a wakeup word. Cluster 420 may therefore be used to generate a block list such as the block list 106 described with respect to FIG. 1.

The media mention detector 400 may comprise a cluster 425 associated with content asset Program C. Cluster 425 may comprise stored fingerprints associated with content asset Program C that is a different program from Program A and Program B. The cluster 425 may be open such that, after the fingerprint comparer compares a received fingerprint associated with content asset Program C to one or more stored fingerprints associated with the content asset Program C and finds a match as a result of the comparison, the received fingerprint may be stored in cluster 425. Alternatively or additionally, cluster 425 may be a closed cluster and additional received fingerprints associated with content asset Program C may not be added to cluster 425. A determination may be made to close cluster 425 when it comprises enough fingerprints. Cluster 425 may comprise data indicating that the cluster 425 does not comprise a media mention and therefore may indicate that content asset Program C, cluster 425 does not comprise a wakeup word. Alternatively or additionally, cluster 425 may comprise data indicating that the cluster 425 does not comprise a near media mention and therefore may indicate that content asset Program C, cluster 425 does not comprise a word or words that are similar to a wakeup word such as, for example, because the word or words sound similar to a wakeup word. Cluster 425 may therefore be used to generate an allow list such as the allow list 108 described with respect to FIG. 1.

The media mention detector 400 may further comprise a determiner 430. The determiner 430 may determine, for example, that cluster 1 410 associated with a portion of Program A comprises a near media mention. Additionally or alternatively, the determiner 430 may determine that cluster 1, 410 associated with a portion of Program A comprises a media mention. The determiner 430 may perform this determination function through evaluation of a query transcription provided to the media mention detector 400 at, for example, its receiver 401, from (whether directly or indirectly) the automatic speech recognition engine 230 described with respect to FIG. 2. That is, the ASR 230 may send a query transcription to the voice backend 220 that may then send the query transcription along to the media mention detector 250. Alternatively or additionally, the ASR 230 may send the query transcription to the wakeup word cloud verification module 240 that may then send the query transcription along to the media mention detector 250. Alternatively or additionally, the ASR 230 may send the query transcription directly to the media mention detector 400.

The query transcription may comprise a speech-to-text transcription of audio data collected by the user device 110 after a media mention or near media mention is received by the user device 110. For example, upon receiving a near media mention, the user device 110 may operate as if it heard a wakeup word or activation word. Alternatively, upon receiving a media mention, the user device 110 may operate as if it heard a wakeup word or activation words spoken by a user of the user device 110 rather than receiving the word from the output device 120. The user device 110 may wakeup or activate and listen for a command and send to, for example, the voice backend 220 described with respect to FIG. 2 audio data received for a period of time after it received a media mention or a near media mention. This audio data may be transcribed to text by the ASR engine 230 and sent, either directly or indirectly through other components or devices, to the media mention detector 250.

The determiner 430 of the media mention detector 400 may evaluate this audio data received after the media mention or near media mention (that is, received after the prospective wakeup word) to determine if the audio data reflects, for example, a command to the user device 110 or instead comprises indicia indicating that it does not comprise any command to the user device 110. If the determiner determines that the audio data reflects a command to the user device 110, then this would tend to demonstrate that there was no media mention or near media mention but instead, a user voiced a wakeup word intending to wakeup user device 110. That is, if the query transcription comprises a valid or popular command, then the associated cluster may be considered to reflect a bona fide, user-generated wakeup or activation. If, on the other hand, the determiner 430 determines that the audio data does not reflect a command to the user device 110, then this would tend to demonstrate that there was an unintended activation such as by way of a media mention, a near media mention, or reception by the user device 110 of a prospective wakeup word. For example, if the query transcription is "exit", "quit", "stop listening," then it may reflect that the wakeup or activation was triggered by a media mention or a near media mention (prospective wakeup word). Similarly, if the prospective wakeup word is followed by a long, random transcription, then this also reflects that the trigger may have been by way of media mention or near media mention and that the prospective wakeup word may not be a wakeup word.

The determiner 430 may implement a scoring algorithm running when there may be enough traffic or indication that a cluster belongs to a near media mention or media mention. When this occurs, then as described, the associated fingerprint may be stored into a recent fingerprint block list to block future queries. The query transcription may be analyzed to determine a probability of a near media mention, that is, a probability that the prospective wakeup word is a near media mention and not a wakeup word. If the query transcription contains long and rare commands and matches other queries transcriptions in the cluster, then this may be a strong indication that it is a near media mention. If the query transcription contains an exit or stop command, then this may be a strong indication that comprises a near media mention. If the query transcription contains intelligible silence, then this may indicate a media mention or a near media mention and that the activation was not intended by a user of the user device 110. If, through this scoring-algorithm approach, the associated cluster has a positive near media mention score or a positive media mention score, then the associated fingerprint may be stored in a block list to block future queries. If, through this algorithm, the cluster has negative near media mention score or negative media mention score, then the fingerprint may be stored into an approved list to bypass the handling. Each entry may comprise a live timestamp such that fingerprints may be discarded in the future.

Figure 5:
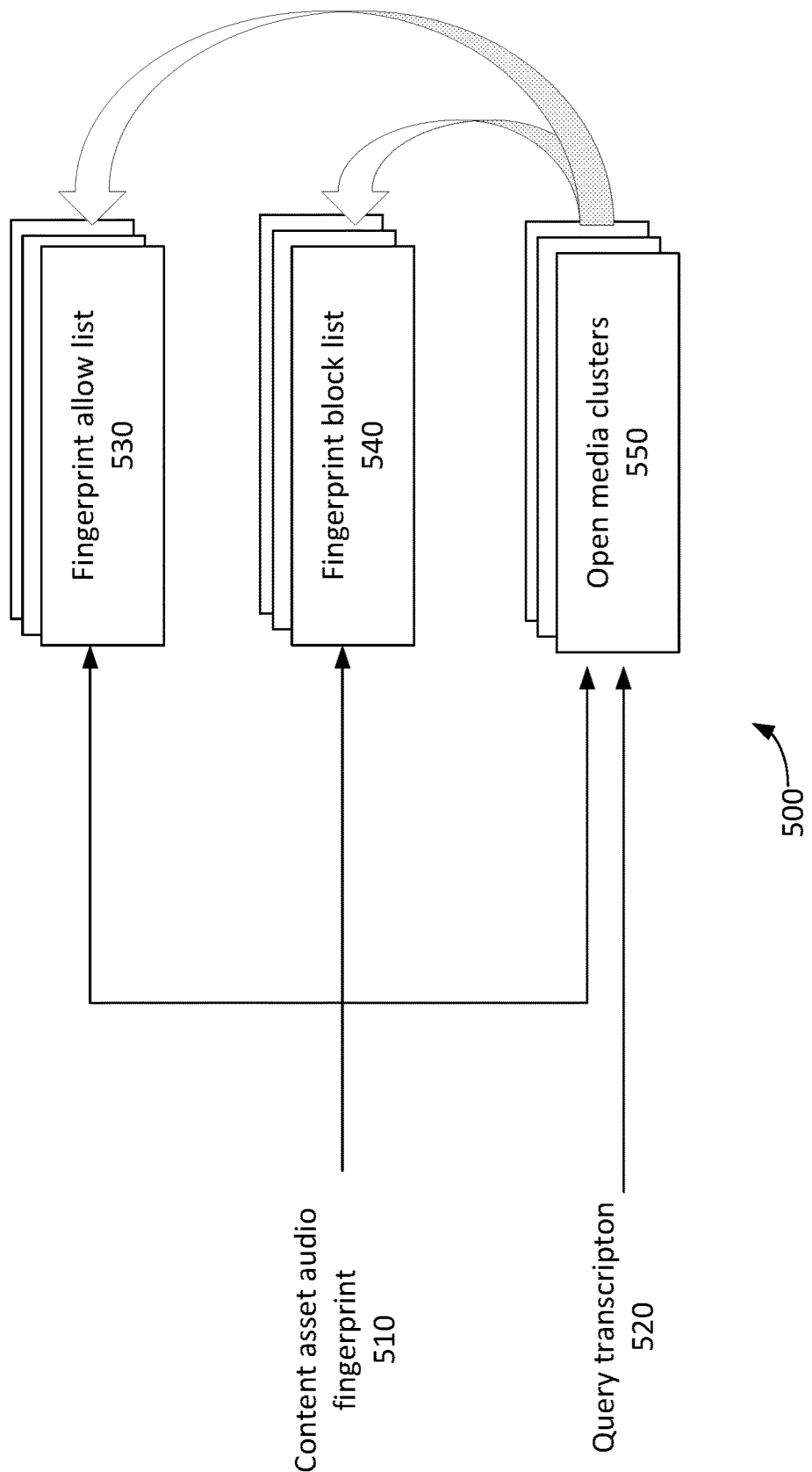
FIG. 5 is a block diagram of an example system.

FIG. 5 depicts a logical diagram of a system 500. The system 500 may be comprised as part of, for example purposes only, the media mention detector 250 or media mention detector 400 depicted in FIG. 2 or FIG. 4 respectively. The system 500 alternatively or additionally may be comprised as part of any other component or device. The system 500 may comprise one or more fingerprint allow lists 530. Fingerprints allow lists that may reflect lists of fingerprints associated with a wakeup word that a determiner such as the determiner 430 described with respect to FIG. 4 has determined as probable user-generated wakeup words. Each of the fingerprint allow lists 530 may be closed in the sense that content asset audio fingerprints are no longer added to any of the lists 530. In this way, a received content asset audio fingerprint 510 may be received and compared to the fingerprint allow list 530. If that comparison results in a match, then the user device 110 may be directed to wake up or activate, or if already awake or activated, to stay away or activated such that the user device 110 may execute received user commands.

The system 500 may further comprise one or more fingerprint block lists 540. Each fingerprint block list 540 may be associated with a portion of a content asset and may comprise near media mentions such as prospective wakeup words mentioned during output of a content asset by an output device such as the output device 120 described with respect to FIG. 1. Each fingerprint block list 540 may result from a determination such as by the determiner 430 described with respect to FIG. 4 that a corresponding prospective wakeup word is associated with a probability that it is a near media mention and not a user-voiced wakeup word for user device such as the user device 110 described with respect to FIG. 1. Each fingerprint block list 540 may further result from a determination such as by the determiner 430 described with respect to FIG. 4 that a corresponding wakeup word is associated with a probability that it is a media mention and not a user-voiced wakeup word for user device such as the user device 110 described with respect to FIG. 1. Each of the fingerprint block lists 540 may be closed in the sense that content asset audio fingerprints are no longer added to any of the lists 540. In this way, a received content asset audio fingerprint 510 may be received and compared to the fingerprint block list 540. If that comparison results in a match, then the user device 110 may be directed to go to sleep or deactivate, or if not already awake or activated, to stay sleeping or deactivated.

The system 500 may further comprise one or more open media clusters 550. The open media clusters 550 may each comprise one or more fingerprints associated with audio data from a particular content asset or portion of such a content asset, as described with respect to FIG. 4. The open media clusters 550 may be open in that received fingerprints that match fingerprints stored in the respective clusters may be added to the cluster to aid the determiner 430 in determining whether a prospective wakeup word or actual wakeup word is associated with a near media mention or media mention, respectively, as described with respect to FIG. 4. Such an open cluster may be one that is still being evaluated to determine a probability that the fingerprint comprises a near media mention or media mention and therefore should be added to a block list. Thus, the open media clusters 550 may receive a query transcription 520. The query transcription may comprise a speech-to-text transcription of audio data collected by the user device 110 after a media mention or near media mention is received by the user device 110. For example, upon receiving a near media mention, the user device 110 may operate as if it heard a wakeup word or activation word. Alternatively, upon receiving a media mention, the user device 110 may operate as if it heard a wakeup word or activation words spoken by a user of the user device 110 rather than receiving the word from the output device 120. The user device 110 may wakeup or activate and listen for a command and send audio data received for a period of time after it received a media mention or a near media mention. This audio data may be transcribed to text by the ASR engine sent for comparison with an open media cluster 550 to determine a probability that the fingerprint comprises a near media mention, a media mention or a bona fide user-generated wakeup or activation command.

Figure 6:
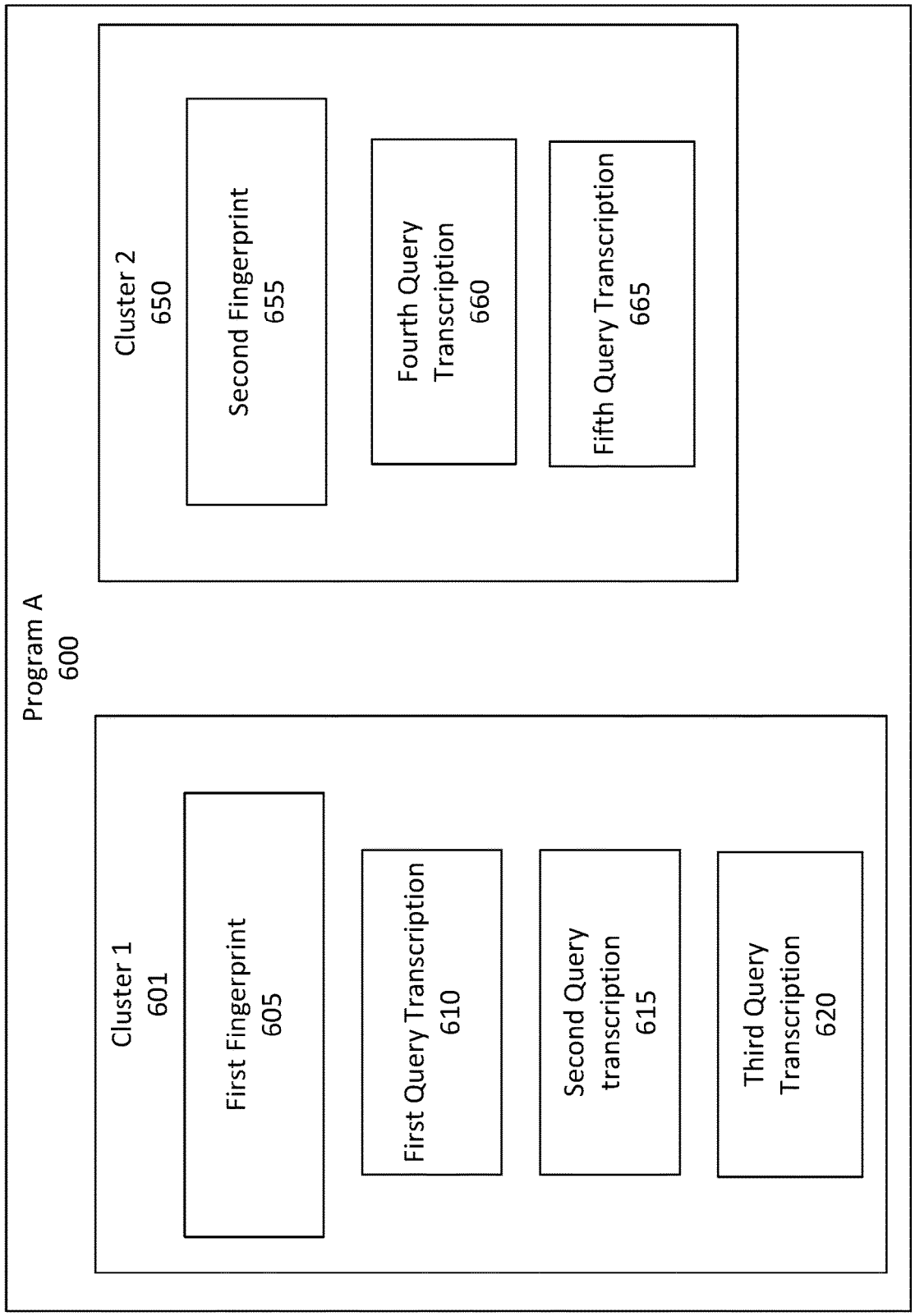
FIG. 6 is a block diagram of an example system.

FIG. 6 depicts a logical diagram of two clusters, cluster 1 601 and cluster 2 650 associated with a content asset Program A 600. Cluster 1 601 may comprise a first fingerprint 605 associated with a first portion of audio data from Program A 600. For example, the first fingerprint 605 may be generated from the first portion of audio data that comprises a media mention of a wakeup word or a near media mention of a prospective wakeup word. The audio data may have been sent from, for example, a premises in which a user device such as the user device 110 is located. The first portion associated with the first fingerprint 605 may have been received by and/or sent by the user device 110.

The cluster 1 601 may further comprise a first query transcription 610. The first query transcription 610 may comprise text resulting from an automatic speech recognition process applied to an audio file also received from the premises, where the process converted the audio file to text. The audio associated with the audio file may have been received by the user device such as the user device 110 located at a premises subsequent to the user device 110 receiving a wakeup word or prospective wakeup word. Alternatively or additionally, the audio associated with the audio file may have been received by the user device 110 prior to or at about the same time as receiving a wakeup word or prospective wakeup word.

The cluster 1 601 may further comprise a second query transcription 615. The second query transcription 615 may have been received from a second premises different from the premises from which the first query transcription 610 was sent. The second query transcription 615 may comprise text resulting from an automatic speech recognition process applied to an audio file received from the second premises, where the process converted the audio file to text. The audio associated with the audio file may have been received by a user device such as the user device 110 located at the second premises subsequent to such user device 110 receiving a wakeup word or prospective wakeup word. Alternatively or additionally, the audio associated with the audio file may have been received by the user device 110 at the second premises prior to or at about the same time as receiving a wakeup word or prospective wakeup word. Such wakeup word or prospective wakeup word may be part of an audio file associated with a fingerprint that matches the first fingerprint 605.

The cluster 1 601 may further comprise a third query transcription 620. The third query transcription 620 may have been received from a third premises different from the premises and the second premises from which the first query transcription 610 and second query transcription 615 were sent. The third query transcription 620 may comprise text resulting from an automatic speech recognition process applied to an audio file received from the third premises, where the process converted the audio file to text. The audio associated with the audio file may have been received by a user device such as the user device 110 located at the third premises subsequent to such user device 110 receiving a wakeup word or prospective wakeup word. Alternatively or additionally, the audio associated with the audio file may have been received by the user device 110 at the third premises prior to or at about the same time as receiving a wakeup word or prospective wakeup word. Such wakeup word or prospective wakeup word may be part of an audio file associated with a fingerprint that matches the first fingerprint 605.

The first, second and third query transcriptions 610, 615, 620 may be analyzed to determine a probability of a near media mention in the audio file associated with the first fingerprint. That is, the three query transcriptions 610, 615, 620 may be analyzed to determine a probability that a prospective wakeup word is a near media mention and not a wakeup word. Alternatively, the three query transcriptions 610, 615, 620 may be analyzed to determine a probability that a wakeup word is a media mention and was not, for example, a wakeup word uttered by a user of the user device 110. If one, two or all three query transcriptions 610, 615, 620 contain long and rare commands and matches other queries transcriptions in the cluster, then this may be a strong indication that there was a near media mention. If one or more query transcriptions 610, 615, 620 contain an exit or stop command, then this may be a strong indication that there was a near media mention. If one or more query transcriptions 610, 615, 620 contain intelligible silence, then this may indicate a media mention or a near media mention and that an activation or wakeup of a user device 110 was not intended by a user of the user device 110. If, through this scoring-algorithm approach, the associated cluster has a positive near media mention score or a positive media mention score, then the associated first fingerprint 605 may be stored in a block list to block future queries. If, through this algorithm, the cluster has negative near media mention score or negative media mention score, then the first fingerprint 605 may be stored into an approved list to bypass the handling.

Cluster 2 650 may comprise a second fingerprint 655 associated with a second portion of audio data from Program A 600. For example, the second fingerprint 655 may be generated from the second portion of audio data that comprises a media mention of a wakeup word or a near media mention of a prospective wakeup word. The audio data may have been sent from, for example, a premises in which a user device such as the user device 110 is located. The second portion associated with the second fingerprint 605 may have been received by and/or sent by the user device 110.

The cluster 2 650 may further comprise a fourth query transcription 660. The fourth query transcription 660 may comprise text resulting from an automatic speech recognition process applied to an audio file also received from the premises, where the process converted the audio file to text. The audio associated with the audio file may have been received by the user device such as the user device 110 located at the premises subsequent to the user device 110 receiving a wakeup word or prospective wakeup word. Alternatively or additionally, the audio associated with the audio file may have been received by the user device 110 prior to or at about the same time as receiving a wakeup word or prospective wakeup word.

The cluster 2 650 may further comprise a fifth query transcription 665. The fifth query transcription 665 may have been received from a second premises different from the premises from which the fourth query transcription 660 was sent. The fifth query transcription 665 may comprise text resulting from an automatic speech recognition process applied to an audio file received from the second premises, where the process converted the audio file to text. The audio associated with the audio file may have been received by a user device such as the user device 110 located at the second premises subsequent to such user device 110 receiving a wakeup word or prospective wakeup word. Alternatively or additionally, the audio associated with the audio file may have been received by the user device 110 at the second premises prior to or at about the same time as receiving a wakeup word or prospective wakeup word. Such wakeup word or prospective wakeup word may be part of an audio file associated with a fingerprint that matches the second fingerprint 655.

The fourth and fifth query transcriptions 660, 665 may be analyzed to determine a probability of a near media mention in the audio file associated with the first fingerprint. That is, the query transcriptions 660, 665 may be analyzed to determine a probability that a prospective wakeup word is a near media mention and not a wakeup word. Alternatively, the three query transcriptions the fourth and fifth query transcriptions 660, 665 may be analyzed to determine a probability that a wakeup word is a media mention and was not, for example, a wakeup word uttered by a user of the user device 110. If one or both query transcriptions 660, 665 contain long and rare commands and match other query transcriptions in the cluster, then this may be a strong indication that there was a near media mention. If one or more query transcriptions 660, 665 contain an exit or stop command, then this may be a strong indication that there was a near media mention. If one or both query transcriptions 660, 665 contain intelligible silence, then this may indicate a media mention or a near media mention and that an activation or wakeup of a user device 110 was not intended by a user of the user device 110. If, through this scoring-algorithm approach, the associated cluster has a positive near media mention score or a positive media mention score, then the associated second fingerprint 655 may be stored in a block list to block future queries. If, through this algorithm, the cluster has negative near media mention score or negative media mention score, then the second fingerprint 655 may be stored into an approved list to bypass the handling.

Figure 7:
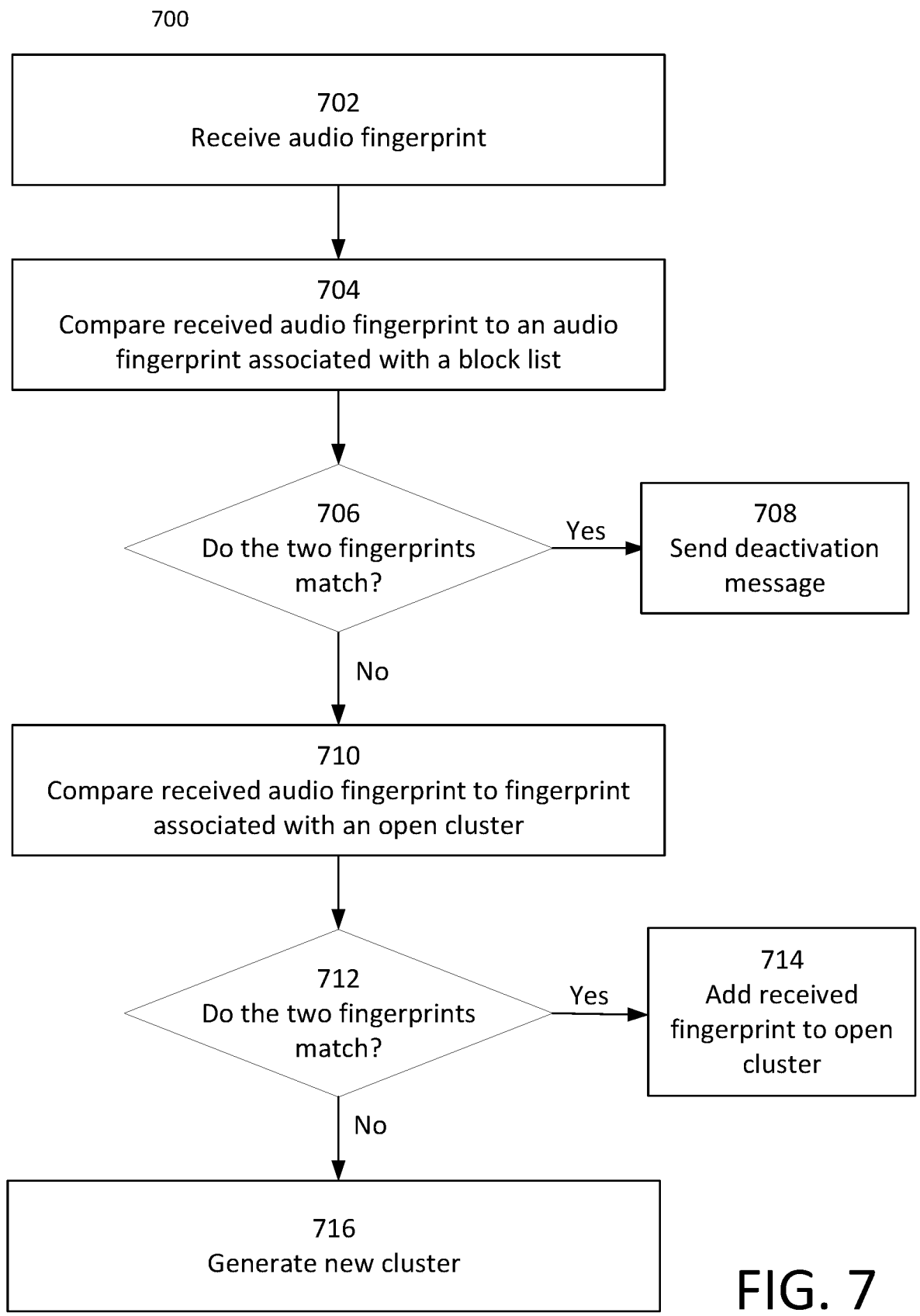
FIG. 7 is a flow chart of an example method.

A method 700 is shown in FIG. 7. At step 702, an audio fingerprint may be received. Such audio fingerprint may be generated based on an audio data file associated with a content asset. The audio data file may comprise a prospective wakeup word. During output of the content asset, a user device such as the user device 110 may have received the prospective wakeup word and may be in the process of determining whether to wake up or activate or to stay awake or continue to be activated.

At step 704, a comparison of the received audio fingerprint may be made to an audio fingerprint associated with a block list. Such block list may be stored locally on the user device 110. Alternatively, such block list may be stored at a server remote from the user device 110. If the fingerprints are determined to match at step 706 then a deactivation message 708 may be sent to the user device 110. This deactivation message may be in the form of a signal or direction to the user device 110 to cease waking up, to not wake up, to deactivate, or to remain deactivated, as the case may be. If, as a result of the comparison at step 706, the received audio fingerprint does not match a fingerprint associated with a block list, then at step 710, the received audio fingerprint may be compared to a fingerprint associated with an open cluster. Such an open cluster may be associated with the content asset. Furthermore, the open cluster may be associated with a portion of the content asset corresponding to approximately the same relative time that the prospective wakeup word was received by the user device 110. That is, for example, if the prospective wakeup word was received 10 minutes after the beginning of the outputting of the content asset, then the cluster may be associated with the 10-minute mark of the content asset or another mark before or after the 10-minute mark. At step 712, a determination may be made whether the received audio fingerprint matches the fingerprint associated with the open cluster. If there is a match, then the received fingerprint may be added to the open cluster at step 714, and any associated query transcription used to determine a probability that the prospective wakeup word associated with the received fingerprint is an actual wakeup word, is a media mention, is not a wakeup word or is a near media mention may likewise be generated and used in the analysis. If the result of step 712 is a determination that the two fingerprints do not match, then at step 716, a new cluster may be generated based on the audio fingerprint received at step 702.

Figure 8:
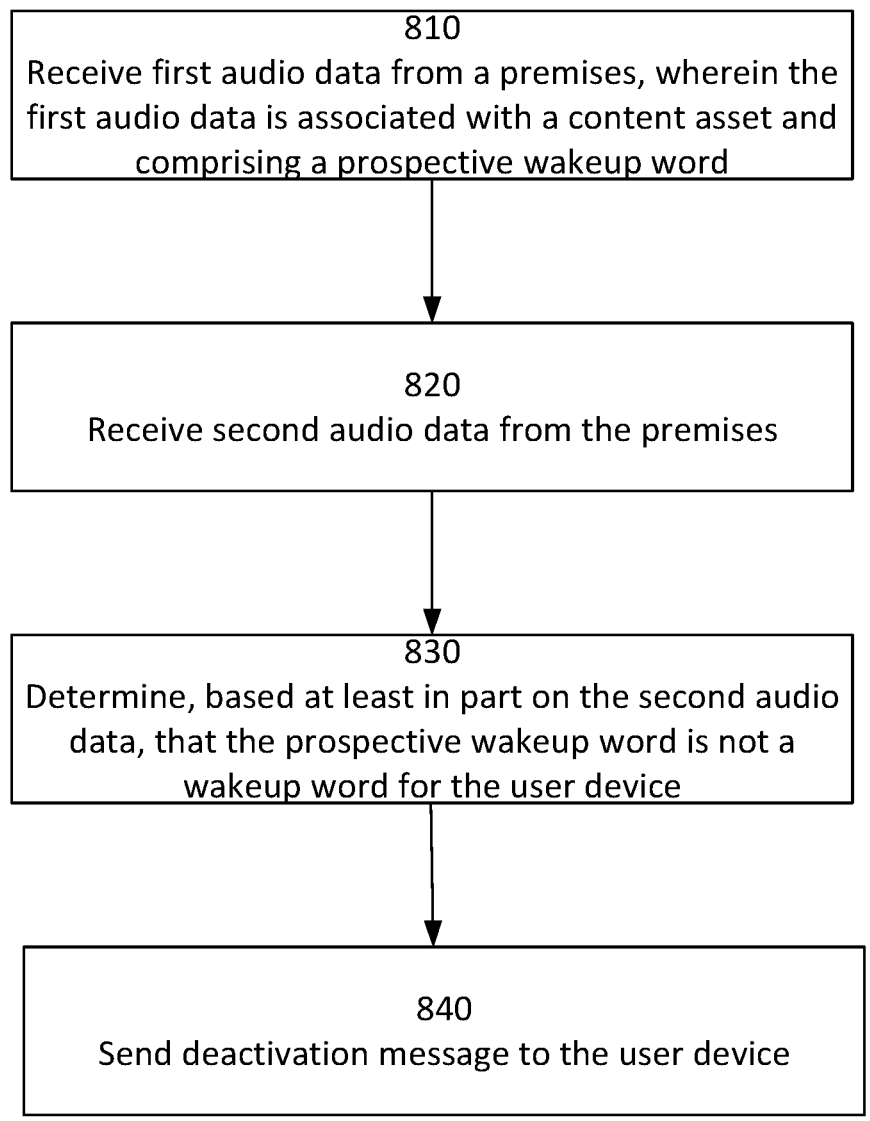
FIG. 8 is a flow chart of an example method.

A method 800 is shown in FIG. 8. First audio data associated with a content asset may be received at step 810. The first audio data may comprise a prospective wakeup word—a word that may correctly activate or wakeup a device or that may, instead, be a media mention or a near media mention. Alternatively, the prospective wakeup word may not have activated the user device 110 but may have triggered or activated or woken the user device 110 enough to investigate whether the prospective wakeup word is a wakeup word by, for example, sending the prospective wakeup word for verification that it is (or is not) a wakeup word or activation word. The user may or may not be aware that the user device 110 is so investigating.

The first audio data may be stored in and retrieved from a buffer of an output device such as the output device 120 described with respect to FIG. 1, and may comprise audio data that preceded the prospective wakeup word and also may comprise audio data that succeeded the wakeup word. The second audio data may be associated with the content asset. Furthermore, the first audio data may be a television program played on a television in the vicinity of the user device 110 such that the user device "hears" or is within reception range of the output of the first audio data.

The method may continue at step 820 where second audio data may be received. Such second audio data may be, for example, query transcription data. The query transcription data may be a transcription of audio data received, for example, by the user device 110 after it received the second audio data associated with the content asset. After receiving the first audio data, the user device 110 may continue to listen or receive more audio data which may then be used to determine a probability that the second audio data (and, more specifically, the prospective wakeup word comprised in the second audio data) is actually a wakeup word stated by a user and not a near media mention or merely a word that sounded like a wakeup word or an actual media mention of a wakeup word. For example, if audio data received by the user device 110 comprised a wakeup word spoken by a user of the user device 110, then the user device 110 next may receive a common command made to such a user device 110. But if the first audio data was actually audio content associated with the content asset output from, for example, the output device 120 described with respect to FIG. 1, then the user device 110 next may receive second audio data that is not a common command made to such a user device 110. The second audio data received at step 820 may be a query transcription of the query next received by the user device 110. Such a query may be a query, a command, a question, silence, background noise, audio from the content asset, or none of these things. Thus the query transcription is evaluated to determine a probability that it contains a query, command or question for the user device 110 to act upon or, instead, is not such a query, command or question.

A determination based on the second audio data may be made at step 830 to determine a probability that the prospective wakeup word is or is not a wakeup word for the user device 110. If the result of the determination is that the prospective wakeup word is not a wakeup word, then at step 840, a message may be sent to the user device 110 (or to the output device 120 for forwarding to the user device 110), indicating that the user device should stay asleep, or not wake up, or go back to sleep, or not wakeup further, or deactivate, or not activate.

Figure 9:
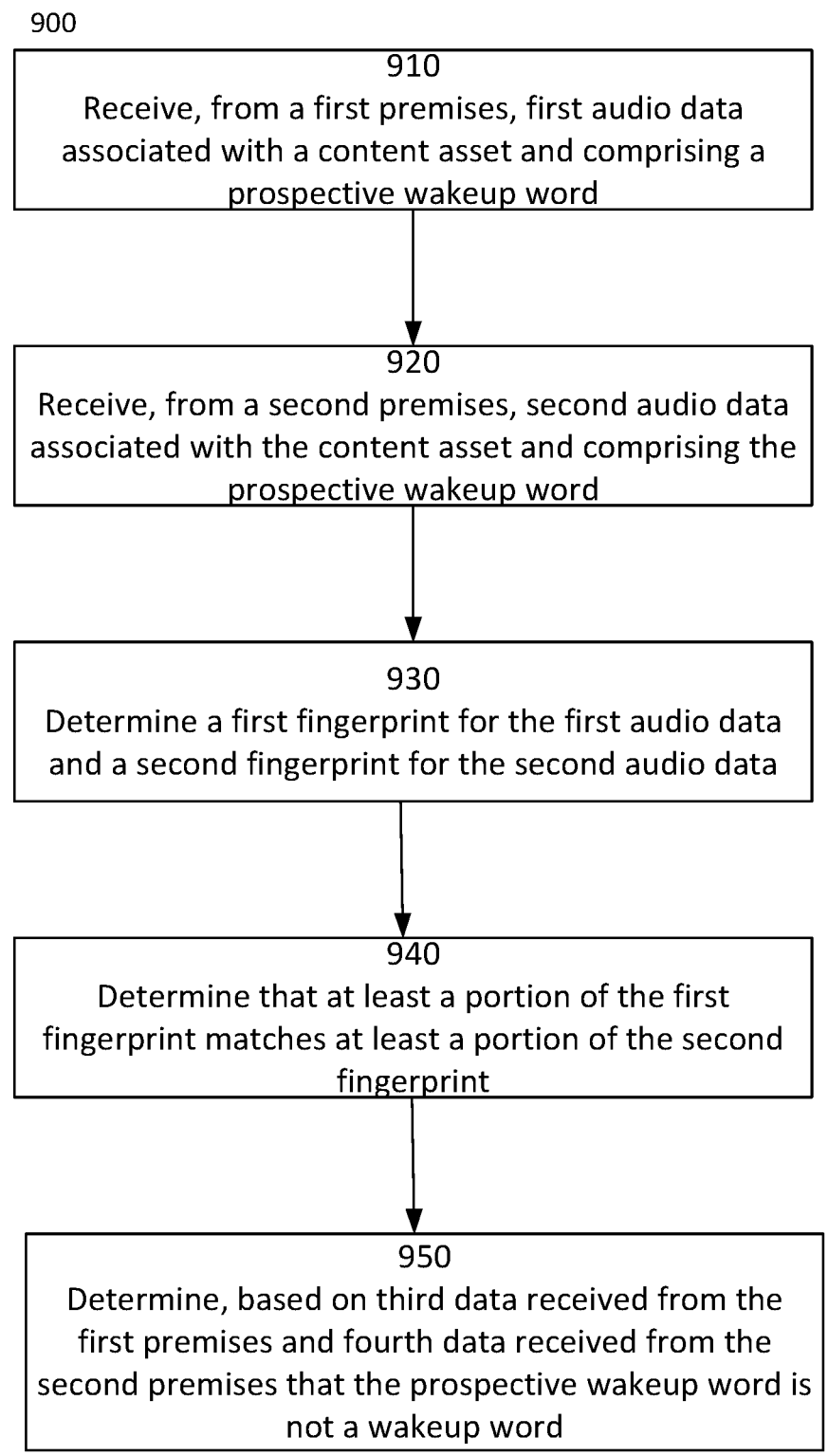
FIG. 9 is a flow chart of an example method.

A method 900 is shown in FIG. 9. At step 910, first audio data associated with a content asset and comprising a prospective wakeup word may be received from a first premises. At step 920, second audio data associated with the content asset referenced in step 910 and also comprising the prospective wakeup word may be received from a second premises. At step 930, a first fingerprint for the first audio data may be determined and a second fingerprint for the second audio data may be determined. At step 940 a determination is made based on a comparison of the first and second fingerprints that at least a portion of the first fingerprint matches at least a portion of the second fingerprint.

At step 950, a determination is made that the prospective wakeup word is not a wakeup word. That is, a user device 110 such as described with respect to FIG. 1 may be configured to enter a sleep or deactivated mode when not in use and to wake upon "hearing" or receiving one of a plurality of wakeup words. Upon receiving such a wakeup word, the user device 110 may wake up or become activated. The determination at step 950 that the prospective wakeup word is not a wakeup word may be based on third data received from the first premises and fourth data received from the second premises. Such third and fourth data may be query transcription data. Such query transcription data may be a transcription of audio data received, for example, by the user device 110 located at each of the first and second premises. After receiving the first audio data at the first premises or the second audio data at the second premises, each user device 110 at the two premises may continue to listen or receive more audio data which may then be used to determine a probability that the audio data (and, more specifically, the prospective wakeup word comprised in the audio data) is actually a wakeup word stated by a user and not a near media mention or merely a word that sounded like a wakeup word or an actual media mention of a wakeup word. For example, if the first or second audio data comprised a wakeup word spoken by a user of the user device 110, then the user device 110 next may receive a common command made to such a user device 110. But if the first or second audio data was instead audio content associated with the content asset output from, for example, the output device 120 described in FIG. 1 and located at each of the first and second premises, then the user device 110 next may receive audio data that is not a common command made to such a user device 110. The third and fourth audio data received at step 950 may be a query transcription of the query next received by the user device 110. Such a query may be a query, a command, a question, silence, background noise, audio from the content asset, or none of these things. Thus the query transcription is evaluated to determine a probability that it contains a query, command or question for the user device 110 at either the first or second premises to act upon or, instead, is not such a query, command or question.

Figure 10:
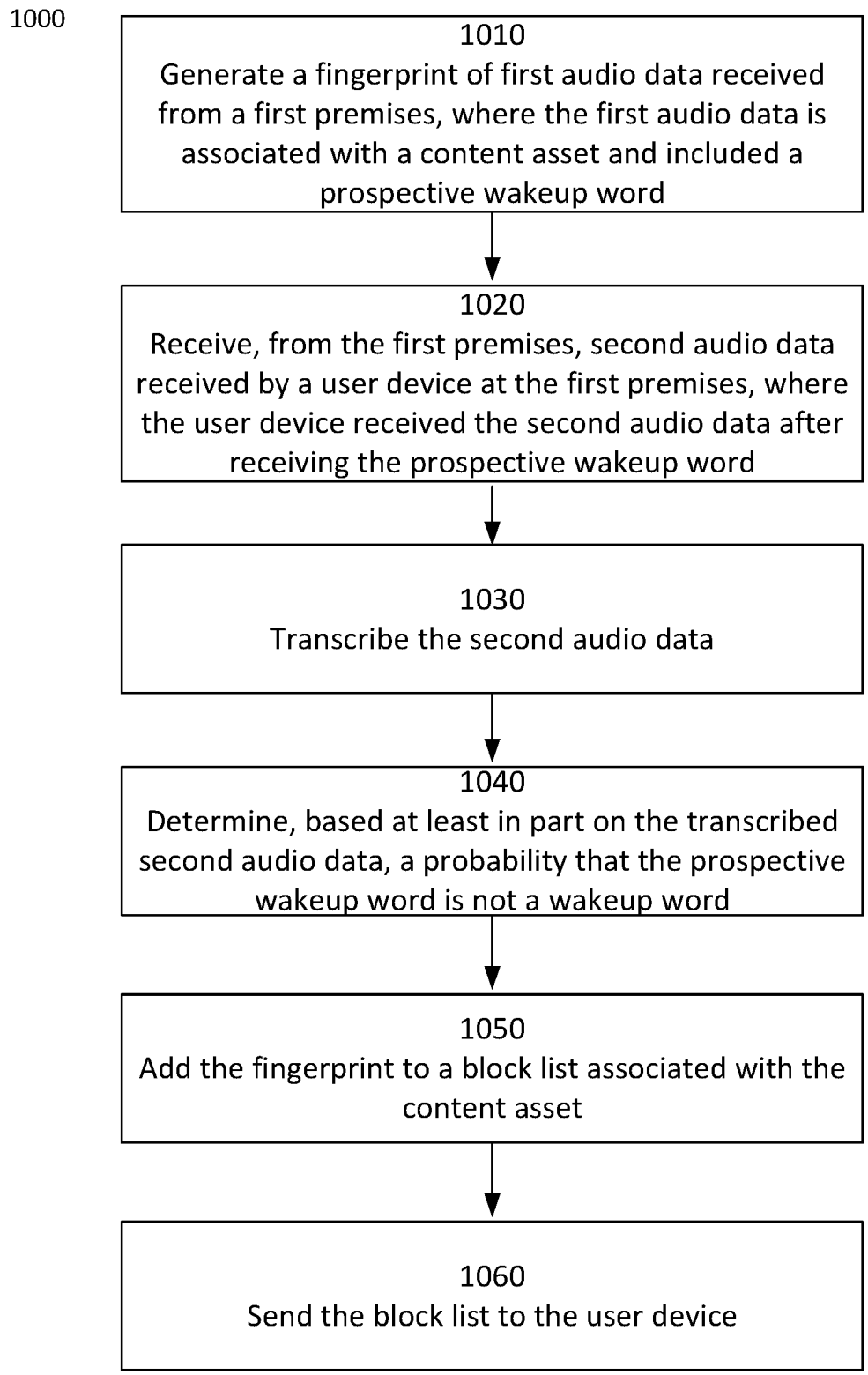
FIG. 10 is a flow chart of an example method.

A method 1000 is shown in FIG. 10. At step 1010, a fingerprint of first audio data received from a first premises is generated where the first audio data is associated with a content asset and comprised a prospective wakeup word. Such prospective wakeup word may be a wakeup word for a user device such as the user device 110 shown in FIG. 1. Alternatively, the prospective wakeup word may be a near media mention—a word that may sound like a wakeup word to the user device 110 but that is not actually a wakeup word and was "heard" or received by the user device 110 during output of a content asset such as a program playing on, or being shown on, a television or being output from a radio, streaming device, or the like.

At step 1020, second audio data may be received from the first premises. Such audio data may have been received by a user device such as the user device 110 at the first premises after the user device received the prospective wakeup word. At step 1030, the second audio data may be transcribed. Based in part on the transcribed second audio data, at step 1040, a probability that the prospective wakeup word is not a wakeup word is determined. For example, a determiner such as the determiner 430 described in FIG. 4 may implement a scoring algorithm when there may be enough traffic or indication that a cluster belongs to a near media mention or media mention. The query transcription resulting from step 1030 may be analyzed to determine a probability of a near media mention, that is, a probability that the prospective wakeup word is a near media mention and not a wakeup word. If the query transcription contains long and rare commands and matches other queries transcriptions in a cluster, then this may be a strong indication that it is a near media mention. If the query transcription contains an exit or stop command, then this may be a strong indication that comprises a near media mention. If the query transcription contains intelligible silence, then this may indicate a media mention or a near media mention and that the activation was not intended by a user of a user device such as the user device 110.

At step 1050, the fingerprint may be added to a block list associated with the content asset. The block list may be sent to the user device 110 (either directly or through the output device 120 of FIG. 1) at step 1060 for local storage and use on the user device. The block list may be sent to other user devices located at other premises as well. A determination may be made to decide which user devices 110 should receive any given block list, taking into account information such as geographic areas where the content asset is available for viewing; a popularity of the content asset; a popularity of the first audio data; or a probability that the content asset is made available for viewing. Taking such information (or any other relevant information) into account may provide an appropriate basis for sending the block list to myriad user devices 110.

Figure 11:
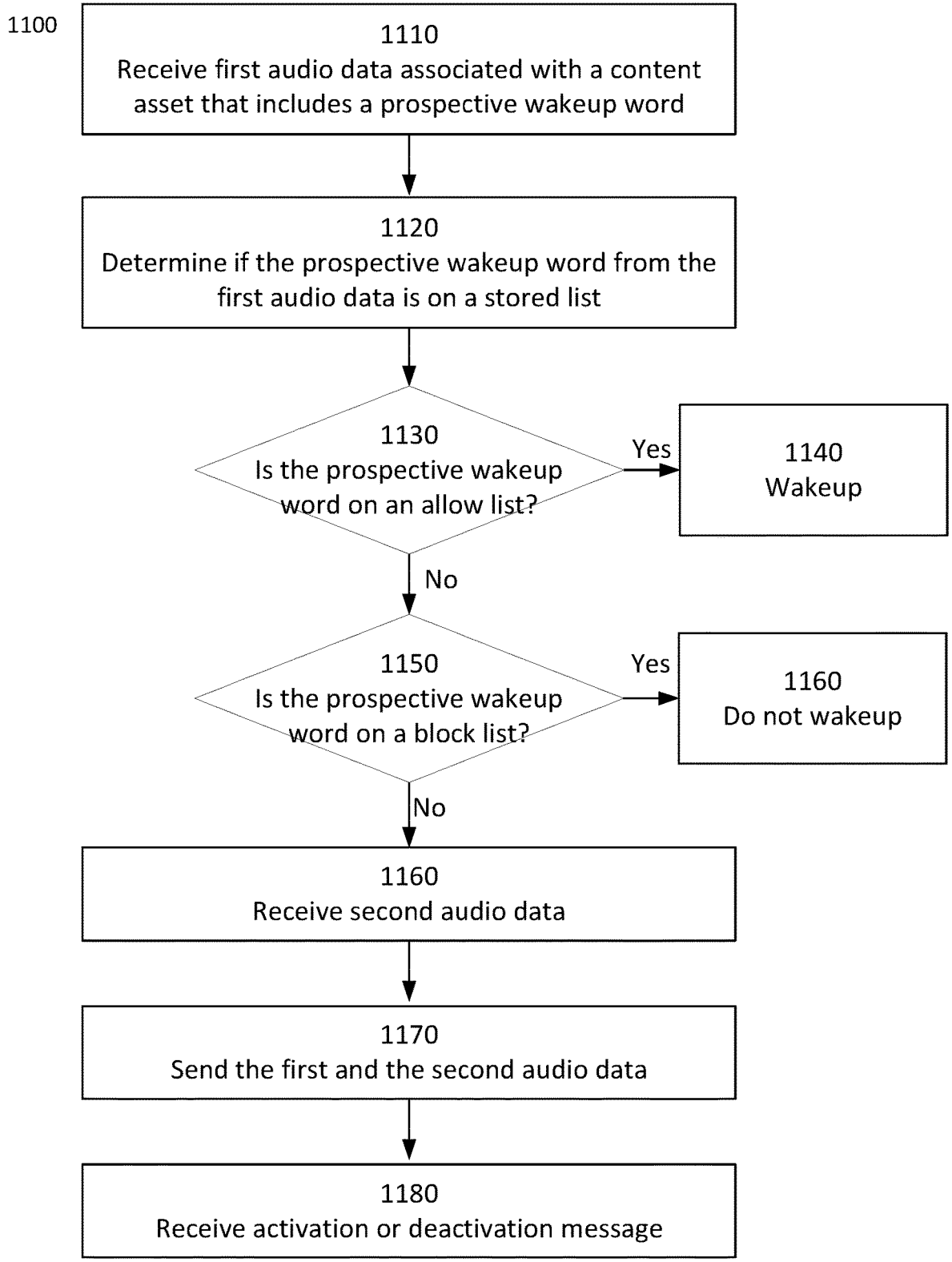
FIG. 11 is a flow chart of an example method.

A method 1100 is shown in FIG. 11. The method may commence at step 1110 when first audio data associated with a content asset that comprises a prospective wakeup word is received. At step 1120, a determination may be made to determine if the prospective wakeup word from the first audio data is on a stored list. If, at step 1130, the prospective wakeup word is found to be stored on an allow list, then at step 1140, a user device such as the user device 110 may wakeup. If at step 1130, however, the prospective wakeup word is absent from an allow list, then at step 1150 a determination may be made to determine if the prospective wakeup word is on a block list. If the prospective wakeup word is present on a block list, then at step 1160, the user device 110 may not be woken up, further woken up, activated or further activated. Instead the user device 1160 may remain sleeping or inactive or be told to go to sleep or become inactive. If at step 1150, the prospective wakeup word is determined to be absent from a block list, then at step 1160, second audio data may be received. Such second audio data may be retrieved or received from a buffer of a device such as the output device 120 described in FIG. 1. At step 1170, the first and second audio data may be sent. For example, the first and second data may be sent to a server that may be capable of determining a probability that the prospective wakeup word is a wakeup word, is a wakeup word used by a user of the user device 110, is not a wakeup word, and/or is a near media mention. At step 1180, an activation or deactivation message may be received. An activation message may be received if there is a determination of a probability that the prospective wakeup word is a wakeup word spoken by a user of the user device 110. A deactivation message may be received if there is a determination of a probability that the prospective wakeup word is a near media mention or a media mention or otherwise is not a wakeup word.

Figure 12:
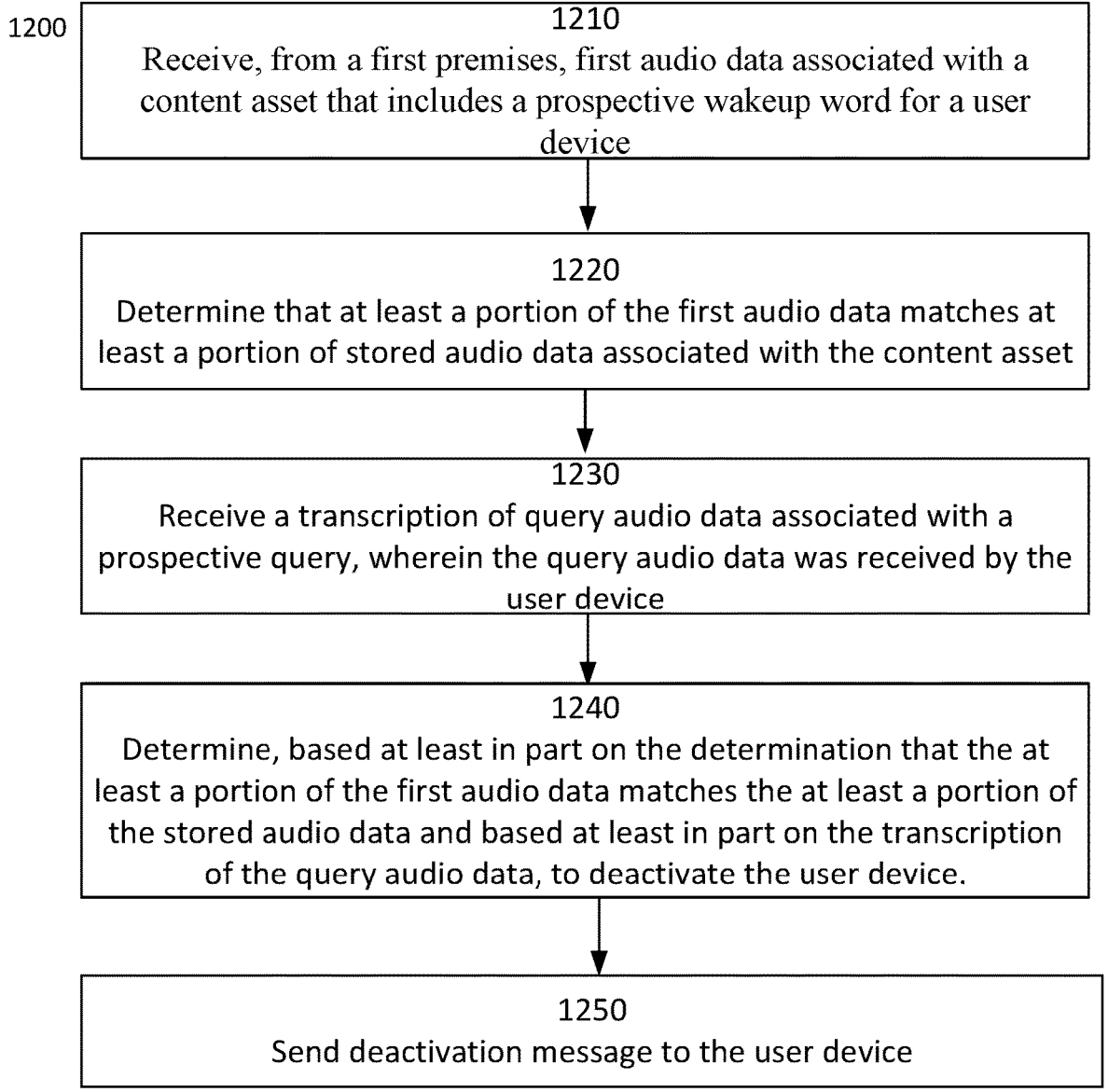
FIG. 12 is a flow chart of an example method.

FIG. 12 depicts a method 1200. At step 1210, first audio data associated with a content asset that comprises a prospective wakeup word for a user device may be received. The user device may be the user device described with respect to FIG. 1. At step 1220, at least a portion of the first audio data may be determined to match at least a portion of stored audio data associated with the content asset. Such determination may be performed by first determining fingerprints of the first and stored audio data and comparing the fingerprints or at least portions of the fingerprints.

At step 1230, a transcription of query audio data associated with a prospective query (or comment, or question, or other audio data) received by the user device may be received. At step 1240, a determination to deactivate the user device may be made based at least in part on the determination that the at least a portion of the first audio data matches the at least a portion of the stored audio data and based at least in part on the transcription of the query audio data. A deactivation message may be sent to the user device at step 1250 as a result of the determination of step 1240.

Figure 13:
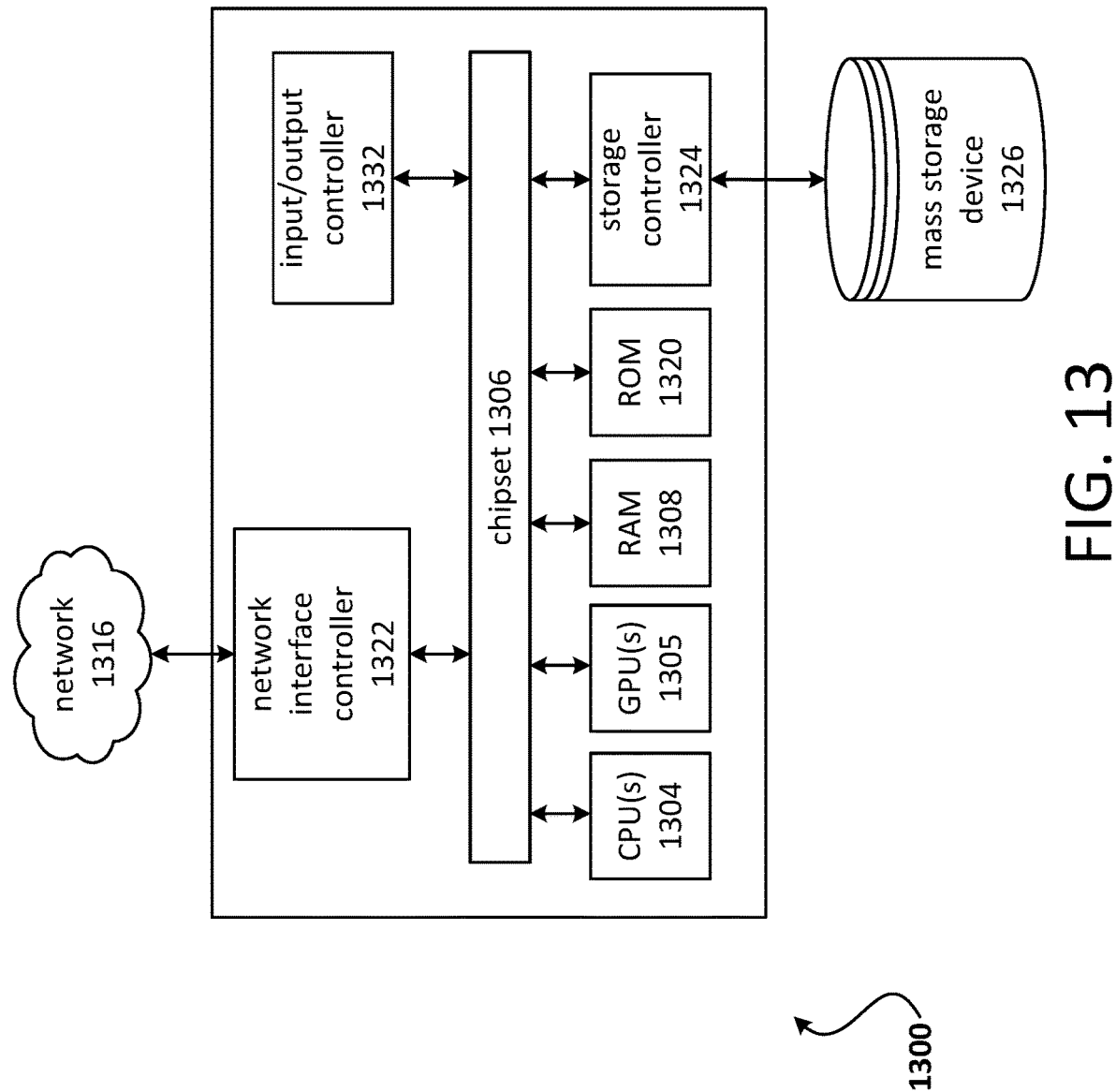
FIG. 13 is a block diagram of an example computing device.

FIG. 13 depicts a computing device that may be used in various aspects, such as the servers, modules, and/or devices depicted in FIGS. 1, 2, 4, 5 and 6. With regard to the example architecture of FIG. 1, for example, the user device 110 and/or the output device 120 may each be implemented in an instance of a computing device 1300 of FIG. 13. The same is true for the voice backend 220, the ASR engine 230, the wakeup word cloud verification module 240, and the media mention detector 250 shown in FIG. 2, and the media mention detector 400 shown in FIG. 4. The computer architecture shown in FIG. 13 illustrates a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 7-12.

The computing device 1300 may comprise a baseboard, or "motherboard," which is a printed circuit board to which a multitude of components or devices may be connected by way of a system bus or other electrical communication paths. One or more central processing units (CPUs) 1304 may operate in conjunction with a chipset 1306. The CPU(s) 1304 may be standard programmable processors that perform arithmetic and logical operations necessary for the operation of the computing device 1300.

The CPU(s) 1304 may perform the necessary operations by transitioning from one discrete physical state to the next through the manipulation of switching elements that differentiate between and change these states. Switching elements may generally comprise electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1304 may be augmented with or replaced by other processing units, such as GPU(s) 1305. The GPU(s) 1305 may comprise processing units specialized for but not necessarily limited to highly parallel computations, such as graphics and other visualization-related processing.

A chipset 1306 may provide an interface between the CPU(s) 1304 and the remainder of the components and devices on the baseboard. The chipset 1306 may provide an interface to a random access memory (RAM) 1308 used as the main memory in the computing device 1300. The chipset 1306 may provide an interface to a computer-readable storage medium, such as a read-only memory (ROM) 1320 or non-volatile RAM (NVRAM) (not shown), for storing basic routines that may help to start up the computing device 1300 and to transfer information between the various components and devices. ROM 1320 or NVRAM may also store other software components necessary for the operation of the computing device 1300 in accordance with the aspects described herein.

The computing device 1300 may operate in a networked environment using logical connections to remote computing nodes and computer systems through local area network (LAN) 1316. The chipset 1306 may comprise functionality for providing network connectivity through a network interface controller (NIC) 1322, such as a gigabit Ethernet adapter. A NIC 1322 may be capable of connecting the computing device 1300 to other computing nodes over a network 1316. It should be appreciated that multiple NICs 1322 may be present in the computing device 1300, connecting the computing device to other types of networks and remote computer systems.

The computing device 1300 may be connected to a mass storage device 1326 that provides non-volatile storage for the computer. The mass storage device 1326 may store system programs, application programs, other program modules, and data, which have been described in greater detail herein. The mass storage device 1326 may be connected to the computing device 1300 through a storage controller 1324 connected to the chipset 1306. The mass storage device 1326 may consist of one or more physical storage units. A storage controller 1324 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1300 may store data on a mass storage device 1326 by transforming the physical state of the physical storage units to reflect the information being stored. The specific transformation of a physical state may depend on various factors and on different implementations of this description. Examples of such factors may comprise, but are not limited to, the technology used to implement the physical storage units and whether the mass storage device 1326 is characterized as primary or secondary storage and the like.

For example, the computing device 1300 may store information to the mass storage device 1326 by issuing instructions through a storage controller 1324 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1300 may read information from the mass storage device 1326 by detecting the physical states or characteristics of one or more particular locations within the physical storage units.

In addition to the mass storage device 1326 described herein, the computing device 1300 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1300.

By way of example and not limitation, computer-readable storage media may comprise volatile and non-volatile, transitory computer-readable storage media and non-transitory computer-readable storage media, and removable and non-removable media implemented in any method or technology. Computer-readable storage media comprises, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1326 depicted in FIG. 13, may store an operating system utilized to control the operation of the computing device 1300. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The mass storage device 1326 may store other system or application programs and data utilized by the computing device 1300.

The mass storage device 1326 or other computer-readable storage media may also be encoded with computer-executable instructions, which, when loaded into the computing device 1300, transforms the computing device from a general-purpose computing system into a special-purpose computer capable of implementing the aspects described herein. These computer-executable instructions transform the computing device 1300 by specifying how the CPU(s) 1304 transition between states, as described herein. The computing device 1300 may have access to computer-readable storage media storing computer-executable instructions, which, when executed by the computing device 1300, may perform the methods described in relation to FIGS. 7-12.

A computing device, such as the computing device 1300 depicted in FIG. 13, may also comprise an input/output controller 1332 for receiving and processing input from a number of input devices, such as a keyboard, a mouse, a touchpad, a touch screen, an electronic stylus, or other type of input device. Similarly, an input/output controller 1332 may provide output to a display, such as a computer monitor, a flat-panel display, a digital projector, a printer, a plotter, or other type of output device. It will be appreciated that the computing device 1300 may not comprise all of the components shown in FIG. 13, may comprise other components that are not explicitly shown in FIG. 13, or may utilize an architecture completely different than that shown in FIG. 13.

As described herein, a computing device may be a physical computing device, such as the computing device 1300 of FIG. 13. A computing node may also comprise a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" comprise plural referents unless the context clearly dictates otherwise. Ranges may be expressed herein as from "about" one particular value, and/or to "about" another particular value. When such a range is expressed, another embodiment comprises from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description comprises instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed.

The present methods and systems may be understood more readily by reference to the detailed description and the examples comprised therein and to the figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A method comprising:
   receiving first audio data from a premises, wherein the first audio data is associated with an output of a content asset and comprises a prospective wakeup word, wherein the prospective wakeup word at least partially activates, at the premises, at least one user device of a plurality of user devices that is configured to be activated upon receiving at least one of a plurality of wakeup words;
   determining that the prospective wakeup word belongs to a cluster associated with the content asset based at least in part on a match between at least a portion of the first audio data and at least a portion of stored audio data associated with the cluster;

receiving second audio data at least in part subsequent to at least partial activation of the at least one user device;

determining, based at least in part on a query transcription of the second audio data and data in the cluster, that the prospective wakeup word is not included in the plurality of wakeup words; and sending a deactivation message to the at least one user device.

2. The method of claim 1, wherein the second audio data is received by the at least one user device.

3. The method of claim 1, wherein the content asset is, at least in part, output to at least one of a television, radio device, or streaming device.

4. The method of claim 1, wherein the first audio data is stored in a buffer of a device associated with the output of the content asset.

5. The method of claim 1, wherein the determining that the prospective wakeup word is not included in the plurality of wakeup words further comprises determining a probability that the prospective wakeup word is not comprised in the plurality of wakeup words.

6. The method of claim 1, wherein the first audio data is stored in a buffer of a first user device of the plurality of user devices that is associated with the output of the content asset and wherein the method further comprises:

receiving third audio data associated with output of the content asset, wherein the third audio data comprises the prospective wakeup word;

determining that at least a portion of the third audio data matches at least a portion of the first audio data;

determining, based at least in part on the determination that the at least a portion of the third audio data matches the at least a portion of the first audio data, that the plurality of wakeup words does not comprise the prospective wakeup word; and sending a first deactivation message to the first user device and a second deactivation message to a second user device of the plurality of user devices.

7. The method of claim 6, wherein the second user device is located at a second premises.

8. The method of claim 6, wherein the determining that the at least a portion of the third audio data matches at least a portion of the first audio data further comprises:

generating a first fingerprint of the at least the portion of the first audio data;

generating a second fingerprint of the at least the portion of the third audio data; and comparing the first fingerprint to the second fingerprint.

9. The method of claim 1, further comprising:

transcribing the second audio data into the query transcription, wherein the determining that the prospective wakeup word is not included in the plurality of wakeup words further comprises determining, based at least in part on the query transcription, a probability that the plurality of wakeup words does not comprise the prospective wakeup word.

10. The method of claim 1, further comprising:

sending to the at least one user device a block list comprising the prospective wakeup word.

11. The method of claim 10, further comprising:

determining to send the block list to the at least one user device based, at least in part, on at least one of:
a plurality of geographic areas where the content asset is available for viewing,
a popularity of the content asset,
a popularity of the first audio data, or a probability that the content asset is made available for outputting.

12. The method of claim 1, wherein at least a portion of the second audio data temporally succeeds the first audio data.

13. A method comprising:

receiving, from a first premises, first audio data associated with an output of a content asset, wherein the first audio data comprises a prospective wakeup word for at least one user device of a plurality of user devices, wherein the at least one user device is capable of being activated upon receiving at least one of a plurality of wakeup words;

determining that the prospective wakeup word belongs to a cluster associated with the content asset based at least in part on a match between at least a portion of the first audio data and at least a portion of stored audio data associated with the cluster;

receiving first query transcription data of the first audio data at least in part subsequent to the output of the content asset;

determining, based at least in part on data in the cluster and the first query transcription data indicating that the prospective wakeup word is not included in the plurality of wakeup words, to deactivate the at least one user device located at the first premises; and sending a deactivation message to the at least one user device located at the first premises.

14. The method of claim 13, further comprising:

receiving, from a second premises, second audio data associated with the output of the content asset, wherein the second audio data comprises the prospective wakeup word;

receiving second query transcription data of the second audio data; and determining, based at least in part on the second query transcription data, to deactivate the at least one user device.

15. The method of claim 13, wherein the determining that the at least a portion of the first audio data matches the at least a portion of the stored audio data further comprises:

generating a first fingerprint of the at least the portion of the first audio data; and comparing the first fingerprint to a stored fingerprint associated with the stored audio data.

16. The method of claim 13, wherein the first audio data is stored in a buffer of a device associated with the output of the content asset.

17. The method of claim 13, wherein the determining to deactivate the at least one user device further comprises determining a probability that the prospective wakeup word is not comprised in the plurality of wakeup words.

18. A device comprising:

one or more processors; and memory storing instructions that, when executed by the one or more processors, cause the device to:

receive first audio data from a premises, wherein the first audio data is associated with an output of a content asset and comprises a prospective wakeup word, wherein the prospective wakeup word at least partially activates, at the first premises, at least one user device of a plurality of user devices that is capable of being activated upon receiving at least one of a plurality of wakeup words, wherein the plurality of wakeup words does not comprise the prospective wakeup word;

determining that the prospective wakeup word belongs to a cluster associated with the content asset based at least in part on a match between at least a portion of the first audio data and at least a portion of stored audio data associated with the cluster;

receive second audio data at least in part subsequent to at least partial activation of the at least one user device;

determine, based at least in part on a query transcription of the second audio data and data in the cluster, that the prospective wakeup word is not included in the plurality of wakeup words; and send a deactivation message to the at least one user device.

19. The device of claim 18, wherein the memory storing instructions, when executed by the one or more processors, further cause the device to determine a probability that the plurality of wakeup words does not comprise the prospective wakeup word based at least in part on the second audio data.

20. The device of claim 18, wherein the second audio data is received by the at least one user device.

21. The device of claim 18, wherein the content asset is, at least in part, output to at least one of a television, radio device, or streaming device.

22. The device of claim 18, wherein the first audio data is stored in a buffer of a device associated with the output of the content asset.

23. The device of claim 18, wherein the determining that the prospective wakeup word is not included in the plurality of wakeup words further comprises determining a probability that the prospective wakeup word is not comprised in the plurality of wakeup words.

24. The device of claim 18, wherein the first audio data is stored in a buffer of a first user device associated with the output of the content asset and wherein the memory storing instructions of the device, when executed by the one or more processors, further cause the device to:

receive third audio data associated with output of the content asset, wherein the third audio data comprises the prospective wakeup word;

determine that at least a portion of the third audio data matches at least a portion of the first audio data;

determine, based at least in part on the determination that the at least a portion of the third audio data matches the at least a portion of the first audio data, that the plurality of wakeup words does not comprise the prospective wakeup word; and send a first deactivation message to the first user device and a second deactivation message to a second user device.

25. The device of claim 24, wherein the second user device is located at a second premises.

26. The device of claim 18, wherein the memory storing instructions, when executed by the one or more processors, further cause the device to:

determine a probability that the plurality of wakeup words does not comprise the prospective wakeup word.

27. The device of claim 18, wherein the memory storing instructions, when executed by the one or more processors, further cause the device to:

send to the at least one user device a block list comprising the prospective wakeup word.

28. The device of claim 27, wherein the memory storing instructions, when executed by the one or more processors, further cause the device to:

determine to send the block list to the at least one user device based, at least in part, on at least one of:

a plurality of geographic areas where the content asset is available for viewing, a popularity of the content asset, a popularity of the first audio data, or a probability that the content asset is made available for outputting.

29. The device of claim 18, wherein at least a portion of the second audio data temporally succeeds the first audio data.

* * * * *